United States Patent
Zhu et al.

(10) Patent No.: US 10,983,197 B1
(45) Date of Patent: Apr. 20, 2021

(54) ADAPTIVE EMITTER AND RECEIVER FOR LIDAR SYSTEMS

(71) Applicant: Hesai Technology Co., Ltd., Shanghai (CN)

(72) Inventors: Xuezhou Zhu, Shanghai (CN); Kai Sun, Shanghai (CN); Shaoqing Xiang, Shanghai (CN); Jin Yang, Shanghai (CN); Chenluan Wang, Shanghai (CN); Xugang Liu, Shanghai (CN); Wenyi Zhu, Shanghai (CN); Tingyu Yao, Shanghai (CN); Shixiang Wu, Shanghai (CN); Hui Yin, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 32 days.

(21) Appl. No.: 16/827,293

(22) Filed: Mar. 23, 2020

Related U.S. Application Data

(63) Continuation of application No. PCT/CN2020/074590, filed on Feb. 10, 2020.

(51) Int. Cl.
*G01C 3/08* (2006.01)
*G01S 7/4863* (2020.01)
(Continued)

(52) U.S. Cl.
CPC ............ *G01S 7/4863* (2013.01); *G01S 7/484* (2013.01); *G01S 7/4815* (2013.01); *G01S 17/894* (2020.01)

(58) Field of Classification Search
CPC ...... G01S 7/484; G01S 7/4868; G01S 7/4815; G01S 17/89; G01S 17/894; G01S 17/931
(Continued)

(56) References Cited

U.S. PATENT DOCUMENTS 6,956,686 B2    10/2005   Koreeda
7,382,441 B2     6/2008   Kawai et al.
(Continued)

FOREIGN PATENT DOCUMENTS

CN       100425945 C    10/2008
CN       102472956 A     5/2012
(Continued)

OTHER PUBLICATIONS

PCT/CN2020/074590 Search Report & Written Opinion dated Oct. 26, 2020.

*Primary Examiner* — Mark Hellner
(74) *Attorney, Agent, or Firm* — Wilson Sonsini Goodrich & Rosati

(57) ABSTRACT

A Lidar system and method is provided for adaptive control. The Lidar system comprises: an array of emitters each of which is individually addressable and controlled to emit a multi-pulse sequence, at least a subset of the emitters are activated to emit multi-pulse sequences concurrently according to an emission pattern; an array of photosensors each of which is individually addressable, at least a subset of the photosensors are enabled to receive light pulses according to a sensing pattern, each of the subset of photosensors is configured to detect returned light pulses returned and generate an output signal indicative of an amount of optical energy associated with at least a subset of the light pulses; and one or more processors electrically coupled to the array of emitters and the array of photosensors and configured to generate the emission pattern and the sensing pattern based on one or more real-time conditions.

29 Claims, 11 Drawing Sheets

(51) Int. Cl.
  *G01S 17/894* (2020.01)
  *G01S 7/484* (2006.01)
  *G01S 7/481* (2006.01)

(58) Field of Classification Search
  USPC ........................................................ 356/5.01
  See application file for complete search history.

(56) References Cited

U.S. PATENT DOCUMENTS

| | | |
|---|---|---|
| 9,063,549 B1 | 6/2015 | Pennecot et al. |
| 9,804,385 B2 | 10/2017 | Itami et al. |
| 2014/0009747 A1 | 1/2014 | Suzuki et al. |
| 2015/0131080 A1* | 5/2015 | Retterath ................ G01S 17/93 356/5.01 |
| 2017/0195647 A1 | 7/2017 | Honkanen et al. |
| 2018/0284224 A1 | 10/2018 | Weed et al. |
| 2019/0250257 A1* | 8/2019 | Finkelstein ........... G01S 17/931 |
| 2019/0310375 A1* | 10/2019 | Finkelstein ............. G01S 7/484 |
| 2020/0119518 A1* | 4/2020 | Crawford .............. H02M 1/088 |
| 2020/0182983 A1* | 6/2020 | Calder .............. H01L 27/14643 |

FOREIGN PATENT DOCUMENTS

| | | |
|---|---|---|
| CN | 205826866 U | 12/2016 |
| CN | 106291571 A | 1/2017 |
| CN | 107436441 A | 12/2017 |
| CN | 207336754 U | 5/2018 |
| CN | 207675932 U | 7/2018 |
| CN | 109156072 A | 1/2019 |
| CN | 110462424 A | 11/2019 |
| CN | 110554401 A | 12/2019 |
| WO | WO-2019125349 A1 | 6/2019 |

* cited by examiner

US 10,983,197 B1

ADAPTIVE EMITTER AND RECEIVER FOR LIDAR SYSTEMS

CROSS-REFERENCE

This application is a continuation application of International PCT Application Serial No. PCT/CN2020/074590, filed Feb. 10, 2020, which is incorporated herein by reference in its entirety and to which application we claim priority under 35 USC § 120.

BACKGROUND OF THE INVENTION

Light detection and ranging (Lidar) technology can be used to obtain three-dimensional information of an environment by measuring distances to objects. A Lidar system may include at least a light source configured to emit a pulse of light and a detector configured to receive returned pulse of light. The returned pulse of light or light beam may be referred to as echo light beam. Based on the lapse time between the emission of the pulse of light and detection of returned pulse of light (i.e., time of flight), a distance can be obtained. The pulse of light can be generated by a laser emitter then focused through a lens or lens assembly. The returned pulse of light may be received by a detector located near the laser emitter. The returned pulse of light may be scattered light from the surface of an object There exist several types of Lidar systems. Comparing to beam scanning type of Lidar, solid state Lidar systems may not have moving mechanical parts. Instead of rotating through a scene, some solid state Lidar systems flash an entire portion of a scene they intend to capture with light and sense the reflected light. In such systems, the transmitter may include an array of emitters (e.g., surface-emitter laser diodes) that all emit light at once to illuminate the scene. While the entire scene is illuminated simultaneously and an array of sensor pixels of a receiving device of the Lidar system may be used to capture signals in parallel, much like a camera. Cross-talk between the sensor pixels may occur since multi-path reflections especially of neighboring pixels may not be isolated. Moreover, the current flash Lidar systems may require a large amount of power to operate since all of the emitters or detectors are activated at once and they can require a large amount of processing power to process signals from all the pixel detectors at once. The large amount of light emitted can also induce an undesirable amount of stray light that may generate noise at the receiving end, thereby decreasing the signal-to-noise ratio of the sensed signals and resulting in blurred images or blind zone. For example, laser pulse echo signal reflected by the near-field obstacle can be submerged in the delayed pedestal of the stray light due to the saturation of the detector, and the location information of the near-field obstacle may not be determined resulting in a measurement blind zone.

SUMMARY OF THE INVENTION

A need exists for a Lidar system for three-dimensional measurement with improved light ranging accuracy and energy efficiency. A further need exists for a surface emitter or sensor array-based Lidar system with improved dynamic range and signal-noise ratio (SNR). The provided Lidar system may address the above need by employing a dynamically configurable emitting module and detecting module.

The emitting module of the Lidar system may comprise an emitter array such as a VCSEL (vertical-cavity surface-emitting laser) or VECSEL (vertical-external-cavity surface-emitting laser) array that each emitter of the emitter array may be individually addressable or controlled. In some embodiments, the emitting module may be dynamically configurable to adapt to different ranges of distance. For example, the emitting module may be configurable at a pixel level by varying the laser pulse energy emitted by a single emitter corresponding to a pixel. In some cases, the emitting module can be dynamically configured or adjusted per image frame or per distance measurement during operation of the Lidar system.

Individually addressable emitters may allow for a subset of emitters from the array of emitters to be activated for firing light pulses concurrently according to a firing pattern or emission pattern in both the temporal dimension and the spatial domain (e.g., two-dimensional array plane, x-y directions). With such emission pattern synchronized with a sensing pattern of the detecting module, a mapping between the emitters array and the expected signal location of the detector may be established to enable only detectors for which an appreciable signal is expected.

The detecting module of the Lidar system may comprise a photosensor with improved dynamic range such that the Lidar system may be capable of imaging with high imaging resolutions and extended measurement ranges. A photosensor can convert light into an electrical signal. A photosensor may correspond to a particular pixel of resolution in a ranging measurement. In some embodiments of the present disclosure, a photosensor may include a plurality of photodetectors, such as single-photon avalanche diodes (SPADs). The detecting module may be configurable at the pixel level or sub-pixel level, and/or can be adjusted per image frame or per distance measurement.

In some cases, a photosensor may comprise a set of photodetectors such as a photodetector array with the capability to dynamically enable/disable individual photodetector in the photodetector array. As described above, the array of light emitters and the array of photosensors may operate in synchronization such that when one or more light emitters are activated, a corresponding one or more of the photosensors may be activated/enabled and generate a sensor output signal (e.g., pixel value). In some cases, pixels outside of an expected detection location may be disabled and not combined so that signal-noise-ratio (SNR) may not be degraded by noise or ambient light from outside of the region of interest.

In some cases, the detecting module may be configurable at the pixel level such that one or more photodetectors (e.g. SPADs) corresponding to a pixel may be activated/deactivated according to the sensing pattern. In some cases, the operation of a set of photodetectors (e.g., SPADs) or a single photodetector corresponding to a pixel may be configurable such that the amount of optical energy received by the set of photodetectors (e.g., SPADs) or the single photodetector may be controlled thereby controlling the sensor output signal. In some cases, the amount of optical energy to be converted into at an electrical signal may be controlled by controlling the number of SPADs enabled in the set of SPADs corresponding to a signal, and/or by controlling the number of light pulses selected from a set of the returned light pulses. For instance, the detecting module may comprise a pulse-detection circuit that is configured to convert the optical signal to an electrical signal. The pulse-detection circuit may be configured to generate a sensor output signal by varying the amount of received photon energy that is converted into at least one electrical signal. Alternatively, when the electrical signal corresponds to a single light pulse, the pulse-detection circuit may generate a sensor output signal by accumulating different combinations of electrical signals for forming the sensor output signal. In some cases, the pulse-detection circuit may generate a sensor output signal which is indicative of an amount of optical energy associated with a selected subset of the returned light pulses. The amount of photon energy may be varied by varying the number/count of returned light pulses are accumulated for forming an output signal and/or varying the selection of a subset of the returned light pulses such that the corresponding total optical energy can be selected.

In some embodiments, an adaptive control mechanism is provided for a Lidar system. The adaptive control mechanism may be configured to control the firing pattern of a two-dimensional array of light emitters such as by activating only a subset of light emitters at a time, and control the sensing pattern of a two-dimensional array of photosensors by synchronizing the activation/deactivation of individual photosensors within the array concurrently with the firing of corresponding light emitters. In some cases, the sensing pattern may be synchronized with the firing pattern in terms of the two-dimensional location/address (e.g., row and column index) of the activated emitter/photosensor with respect to the emitter/photosensor array, and one or more operational parameters. For instance, the amount of optical energy received by a group of photodetectors, e.g., SPADs, corresponding to a pixel may be adjusted based on the strength of the emitted light pulses, and the amount of optical energy may be adjusted by controlling the number of enabled/disabled SPADs in the group and/or the number of light pulses accumulated for forming a sensor output signal.

In some cases, each emitter of the emitter array may be individually addressable with suitable emitter-specific driving circuitry so that the emitting module may operate to fire selected groupings of emitters that match the activation/inactivation of the corresponding photosensors. Alternatively or in addition to, each photosensor of the detector array may be individually addressable and controlled with suitable pixel-level circuitry so that the detecting module may operate to enable selected groupings of photosensors that match the activation/inactivation of the corresponding emitters. In some cases, an optimal pattern (e.g., optimal sparse pattern) may be provided such that cross-talk between signal channels may be reduced and energy efficiency may be improved.

In one aspect of the invention, a light detection and ranging system with an adaptive control mechanism is provided. The light detection and ranging system may comprise: an array of emitters that each of the emitters is individually addressable and controlled to emit a multi-pulse sequence into a three-dimensional environment, and at least a subset of the emitters are activated to emit multi-pulse sequences concurrently according to an emission pattern; an array of photosensors that each of the photosensors is individually addressable, and at least a subset of the photosensors are enabled to receive light pulses according to a sensing pattern, and each of the subset of photosensors is configured to detect light pulses returned from the three-dimensional environment and to generate an output signal indicative of an amount of optical energy associated with at least a subset of the light pulses; and one or more processors electrically coupled to the array of emitters and the array of photosensors, and the one or more processors are configured to generate the emission pattern and the sensing pattern based on one or more real-time conditions.

In some embodiments, each of the emitters comprises a set of laser diodes. In some cases, the set of laser diodes are electrically connected and are controlled by a driving circuit.

In some embodiments, the emission pattern comprises an address of an emitter to be activated and a temporal profile of a multi-pulse sequence emitted by the emitter. In some cases, the temporal profile comprises on one or more members selected from the group consisting of amplitude of each pulse from the multi-pulse sequence, duration of each pulse from the multi-pulse sequence, time intervals among the multiple pulses and number of the multiple pulses in the multi-pulse sequence.

In some embodiments, each of the photosensors comprises a set of photodetectors. In some cases, each of the set of photodetectors is individually addressable and controlled. In some cases, a subset photodetectors from the set of photodetectors to be enabled to receive light pulses according to the sensing pattern. In some cases, the sensing pattern comprises an address of a photosensor to be enabled, an address of a photodetector to be enabled, or one or more parameters for selecting the subset of the light pulses. The one or more parameters comprise a number of light pulses in the subset or a parameter indicating a combination of non-consecutive light pulses.

In some embodiments, the one or more real-time conditions are obtained based on the detected light pulses. In some embodiments, the one or more real-time conditions comprise detection of an object located within a pre-determined distance threshold. In some embodiments, the one or more processors are further configured to calculate a distance based on a time of flight associated with the subset of the light pulses. In some cases, the time of flight is determined by determining a match between the light pulses returned from the three-dimensional environment and a temporal profile of the emission pattern.

Another aspect of the present disclosure provides a method of providing adaptive control for alight detection and ranging system. The method may comprise: generating an emission pattern and a sensing pattern based on one or more real-time conditions; activating, according to the emission pattern, at least a subset of emitters from an array of emitters to emit multi-pulse sequences concurrently, wherein each of the array of emitters is individually addressable and controlled to emit a multi-pulse sequence into a three-dimensional environment; and enabling at least a subset of photosensors from an array of individually addressable photosensors to receive light pulses according to a sensing pattern, and each photosensor of the subset of photosensors is configured to detect light pulses returned from the three-dimensional environment and to generate an output signal indicative of an amount of optical energy associated with at least a subset of the light pulses.

In some embodiments, each emitter of the array of emitters comprises a set of laser diodes. In some cases, the set of laser diodes are electrically connected and the set of laser diodes are controlled by a driving circuit.

In some embodiments, the emission pattern comprises an address of an emitter to be activated and a temporal profile of a multi-pulse sequence emitted by the emitter. In some cases, the temporal profile comprises one or more members selected from the group consisting of amplitude of each pulse from the multi-pulse sequence, duration of each pulse from the multi-pulse sequence, time intervals among the multiple pulses and number of the multiple pulses in the multi-pulse sequence.

In some embodiments, each photosensor of the array of photosensors comprises a set of potodetectors. In some cases, each photodetector of the set of photodetectors is individually addressable and controlled. In some cases, a subset of photodetectors from the set of photodetectors are enabled to receive light pulses according to the sensing pattern. In some cases, the sensing pattern comprises an address of a photosensor to be enabled, an address of a photodetector to be enabled, or one or more parameters for selecting the subset of the light pulses. in such cases, the one or more parameters comprise a number of light pulses in the subset of the light pulses or a parameter indicating a combination of non-consecutive light pulses.

In some embodiments, the one or more real-time conditions are obtained based on the detected light pulses. In some embodiments, the one or more real-time conditions comprise detection of an object located within a pre-determined distance threshold.

In some embodiments, the method further comprises calculating a distance based on a time of flight associated with the subset of the light pulses. In some cases, the time of flight is determined by determining a match between the light pulses returned from the three-dimensional environment and a temporal profile of the emission pattern.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
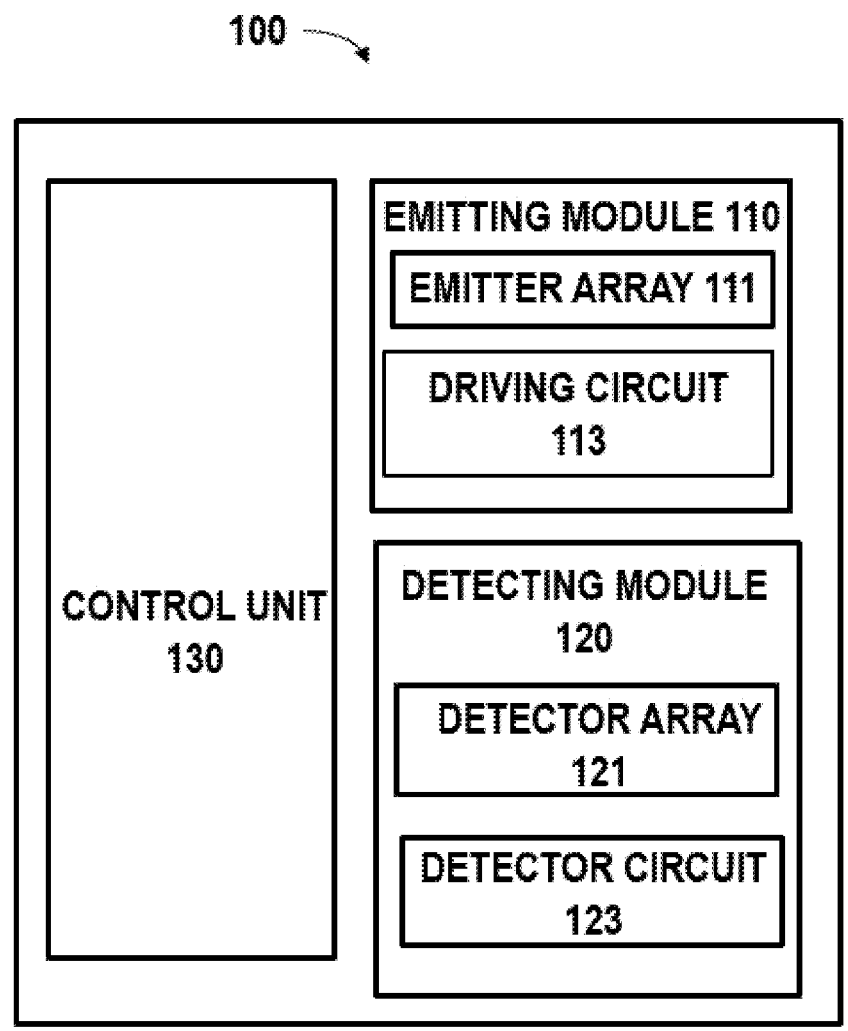
FIG. 1 schematically shows an example of a Lidar system, in accordance with some embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

A Lidar system may be referred to as a laser ranging system, a laser radar system, a LIDAR system, or a laser/light detection and ranging (LADAR or ladar) system. Lidar is a type of ranging sensor characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time (e.g., time of flight or delay time) of electromagnetic waves between a source and a target.

As utilized herein, the term "multi-pulse sequence", may generate refer to a sequence of light pulses or signals which are used interchangeably throughout the specification unless context suggests otherwise. As utilized herein, the term "measurement signals" generally refers to emitted light pulses or light pulses emitted from the emitting apparatus of the Lidar system unless context suggests otherwise. As utilized herein, the term "echo beams" may generally refer to return signals or returned light pulses which can be used interchangeably throughout the specification unless context suggests otherwise. A delay time may refer to the period of time between which the sequence of light pulses leaves the emitter and the reflected sequence of light pulses is received at the receiver. The delay time may then be used to compute a distance measurement. The delay time may also be referred to as time of flight which can be used interchangeably throughout the specification.

A sequence of light pulses may comprise multiple pulses emitted within short time duration such that the sequence of light pulses may be used to derive a distance measurement point. For example, Lidar can be used for three-dimensional (3D) imaging (e.g., 3D point cloud) or detecting obstacles. In such cases, a distance measurement associated with a sequence of light pulses can be considered a pixel, and a collection of pixels emitted and captured in succession (i.e., "point cloud") can be rendered as an image or analyzed for other reasons (e.g., detecting obstacles). A sequence of light pulses may be generated and emitted within a duration of, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 µs, 2 µs, 3 µs, 4 µs, 5 µs. The time intervals among sequences may be constant or variable.

In some cases, a multi-pulse sequence emitted by an emitter may be modulated according to a pre-determined temporal profile. The temporal profile may be specified by a firing pattern of the emitting module. The term "firing pattern" may also be referred to as emission pattern which are used interchangeably throughout the specification. One or more parameters of the firing pattern (e.g., amplitude of a given light pulse, etc) may be specified according to the temporal profile. In some cases, the temporal profile may be defined by a plurality of factors including, but not limited to, the number of pulses, time intervals, duration of pulses, amplitude of pulses, a ratio tween amplitudes of any two pulses (e.g., amplitude ratio), a ratio between durations of any two pulses in a sequence (e.g., duration ratio), duty cycle (e.g., ratio between duration of multi-pulse sequence and time interval between sequences), and various others derivatives. The pre-determined temporal profile may also beneficially prevent cross-talking among channels or cross-talking between different Lidar systems.

In some cases, a multi-pulse sequence may be emitted to a spot in a 3D environment and a successive multi-pulse sequence may be emitted to a different spot in the 3D environment. In some cases, all of the pixels (e.g., distance measurements) are obtained using multi-pulse sequences. In some cases, a selected subset of pixels is obtained using multi-pulse sequences and the remaining pixels may be obtained using un-encoded signals (e.g., single light pulse). For example, a selected subset of pixels in 3D imaging may be obtained using encoded signals such that each pixel may be generated based on a multi-pulse sequence and another subset of pixels may be obtained using un-encoded signals such that each pixel may be generated using a single light pulse. In some cases, measurement signals may be encoded at a coding frequency such that multi-pulse sequences may be interspersed with un-encoded signals at the coding frequency. For instance, a multi-pulse sequence may be followed by one or more un-encoded signals (e.g., single pulses) according to the coding frequency. The coding frequency may be specified by the firing pattern or emission pattern. In some cases, a selected portion of the returned multiple pulses in a sequence may be used for deriving a pixel value (e.g., intensity) and/or for calculating a distance.

The output beam or signal light may then be directed into a space for measurements. As an example, output beam may have an average power of approximately 1 mW, 10 mW, 100 mW, 1 W, 10 W, or any other suitable average power. As another example, output beam may include pulses with a pulse energy of approximately 0.1 µJ, 1 µJ, 10 µJ, 100 µJ, 1 mJ, or any other suitable pulse energy. As another example, output beam may include pulses with a peak power of approximately 10 W, 100 W, 1 kW, 2 kW, 5 kW, 10 kW, or any other suitable peak power. An optical pulse with a duration of 400 µs and a pulse energy of 1µ has a peak power of approximately 2.5 kW. If the pulse repetition frequency is 500 kHz, then the average power of an output beam with 1 µJ pulses is approximately 0.5 W. In some cases, the wavelength of the output beam may be in the range of 800 nm to 1600 nm or in any other suitable range. In some cases, the wavelength of the output beam may be in the range of 1530 nm to 1570 nm to provide eye-safe laser. In the example of a VCSEL array, the light pulse duration, characterized by the full-width half maximum (FWHM), may be about a few nanoseconds (ns) such as 3 ns, with a duty cycle (e.g., ratio between duration of multi-pulse sequence and time interval between sequences) of about 0.1%, center wavelength at about 850 nm, peak power at 1 W/VCSEL and wavelength variation on the entire emitter array of no more than 1 nm.

A detector may be a photodetector or photosensitive detector. A detector may comprise one or more photosensors each of which can convert light into an electrical signal. A photosensor may include a plurality of photodetectors, such as single-photon avalanche diodes (SPADs). A photosensor may correspond to a particular pixel of resolution in a ranging measurement. The detector may be provided with the capability to dynamically enable/disable individual pixels in the array and/or dynamically enable/disable a subset of SPADs in a pixel thereby configuring the detector at the pixel level or sub-pixel level.

In some embodiments, the provided methods and systems may be implemented as a solid state Lidar system with improved performance. As described above, a solid state Lidar system may refer to the form of Lidar that does not have moving mechanical parts. Compared to spinning Lidars in which lasers and/or detectors are mounted on a spinning head or other electromechanically-intensive traditional Lidar system, the solid state Lidar system has advantages that it is more resilient to vibrations, less expensive in manufacturing, and smaller in size.

However, the traditional solid state Lidar systems have their downsides. For instance, flash technique is a traditional approach utilized in solid state Lidar. A flash Lidar may flash an entire portion of a scene they intend to capture with light and sense the reflected light. In such Lidar systems, the transmitter may include an array of emitters (e.g., surface-emitter laser diodes) that all emit light at once to illuminate the scene and an array of sensor pixels of a receiving device of the Lidar system may be used to capture signals in parallel, much like a camera. However, cross-talk between the sensor pixels may occur since multi-path reflections especially of neighboring pixels may not be isolated. Moreover, the traditional solid state Lidar systems may require a large amount of power to operate since all of the emitters or detectors are activated at once and they can require a large amount of processing power to process signals from all the pixel detectors at once. The large amount of light emitted can also induce an undesirable amount of stray light that may generate noise at the receiving end, thereby decreasing the signal-to-noise ratio of the sensed signals and resulting in blurred images or blind zone. For example, laser pulse echo signal reflected by the near-field obstacle can be submerged in the delayed pedestal of the stray light due to the saturation of the detector, and the location information of the near-field obstacle may not be determined resulting in a measurement blind zone.

The provided Lidar system may have improved performance over the traditional solid state Lidar by employing a surface emitter and sensor array-based Lidar system with improved dynamic range and signal-noise ratio (SNR). In some embodiments, the emitting module of the Lidar system may comprise an emitter array such as a VCSEL (vertical-cavity surface-emitting laser) or VECSEL (vertical-external-cavity surface-emitting laser) array that each emitter of the emitter array may be individually addressable or controlled. The array of VCSELs (vertical-cavity surface-emitting lasers) may allow for power scaling and can provide very short pulses at higher power density. A VCSEL is a semiconductor laser diode where light is emitted perpendicular to the semiconductor substrate surface. VCSELs may require a lower current threshold to turn on and may have a lower sensitivity to temperature compared to other types of light sources.

The detecting module of the provided Lidar may comprise an array of photosensors such as single-photon avalanche diodes (SPADs). The traditional SPADs may not be a very efficient photo detector. The SPADs array can impose a varying level of distortion upon optical signals depending on the signal power and temporal distribution in an effect referred to as "pileup." In a pileup scenario, many SPADs all acting as a single pixel may be triggered at the leading edge of a powerful reflected signal pulse, thereby decreasing numbers of SPADs available to trigger on the trailing edge of the reflected signal since an increasing percentage of SPADs within the pixel are stuck in the dead time state after their initial triggering. The SPADs array of the present disclosure may be individually addressable and controlled thereby providing improved performance.

In some cases, a photosensor may comprise a SPADs array that may be individually addressable and controlled such that the SPADs array corresponding to a pixel can be powered on/off. Alternatively or in addition to, one or more operational parameters of an individual photosensor may be controlled or dynamically configured by powering on/off a subset of one or more SPADs selected from a SPDAs array corresponding to a pixel.

FIG. 1 schematically shows an example of a Lidar system 100, in accordance with some embodiments of the invention. In some embodiments, a Lidar system 100 may comprise an emitting module 110, a detecting module 120, and a control unit 130. The detecting module 120 may comprise a detector array 121, which can be, e.g., a two-dimensional array of photosensors that each photosensor may be individually addressable and/or controlled. A photosensor may correspond to a particular pixel of resolution in a ranging measurement. The detector array 121 may be operably coupled to a detector circuit 123 that is configured to dynamically enable/disable individual pixels in the array thereby providing a detecting module 120 with improved dynamic range and an improved resistance to cross talk effects. In some cases, the detector circuit 123 may be configured to control the on/off of a subset of photodetectors (e.g., SPADs) selected from the set of SPADs array corresponding to a pixel thereby configuring the operation status/performance of the detector at sub-pixel level. The emitting module 110 may comprise an emitter array 111 that each emitter of the emitter array may be individually addressable and/or controlled. The individually addressable emitters may allow for a subset of emitters from the array of emitters to be activated for firing multi-pulse sequences thereby forming a firing pattern or emission pattern in both the temporal domain (e.g., temporal profile of a multi-pulse sequence) and a two-dimensional (e.g., x-y directions) spatial domain.

In some embodiments, the emitting module 110 may comprise at least one light source configured to generate laser beams or pulses of light. In some embodiments, the light source may comprise an emitter array 111. The emitter array 111 may be a two-dimensional array or a linear array. The emitter array 111 may comprise an array of individually addressable lasers. In some cases, the light source may comprise a plurality of electrically connected surface-emitting laser diodes, such as VCSELs (vertical-external-cavity surface-emitting lasers) array that each emitter of the emitter array may be individually addressable or controlled. Other types of pulsed laser array such as other surface-emitting laser diode or edge-emitting laser diode, other types of semiconductor laser or non-semiconductor laser can also be employed. Details about the layout and arrangement of the emitter array and emitting module are described with respect to FIG. 2.

In some cases, the emitting module 110 may comprise a driving circuit 113 configured to control the plurality of lasers/emitters in the emitter array. For example, a plurality of driver transistors may be arranged in an array such that each driver transistor is connected with a column or row (or other subset) of VCSELs, allowing for individual control of respective individual VCSEL. For example, the emitter array may be configured as a two-dimensional m×n array of emitters having m number of columns and n number of rows, the layout of the driving circuit 113 may be designed such that each address (e.g., row index, column index) of the m×n array can be selected by a row selector and a column selector of the driving circuit 113. In some cases, the driving circuit 113 may receive control signals from the control unit 130 for configuring or controlling a selected set of one or more emitters. Details about the circuitry for individually controlling the VCSELs are describe later herein with respect to FIG. 3.

In some embodiments, the detecting module 120 may comprise a detector array 121, which can be, e.g., a two-dimensional array of photosensors that each photosensor may be individually addressable and/or controlled. A photosensor may correspond to a particular pixel of resolution in a ranging measurement. A detector array may comprise an array of photosensors each of which can convert light into an electrical signal. A photosensor may include a plurality of photodetectors, such as single-photon avalanche diodes (SPADs). The photodetector may be a single-photon avalanche diode (SPAD), a single photon detector or other type of sensors as long as the sensor can be individually controlled and used for outputting a sensor output signal. In some cases, a photosensor may comprise a photodetector array that may be individually addressable and controlled such that the photodetector array corresponding to a pixel can be powered on/off. Alternatively or in addition to, one or more operational parameters of an individual photosensor may be controlled or dynamically configured by powering on/off a subset of one or more photodetector selected from a photodetector array corresponding to a pixel.

The detecting module 120 may be provided with the capability of dynamically enabling/disabling individual pixels in the detector array 121. The detecting module 120 may be provided with the capability to dynamically enable/disable individual pixels in the array and/or dynamically enable/disable a subset of photodetectors (e.g., SPADs) in a pixel thereby configuring the detecting module at the pixel level or sub-pixel level. In some embodiments, the detector array 121 may be operably coupled to a detector circuit 123 that is configured to dynamically enable/disable individual pixels in the array thereby providing a detecting module 120 with high dynamic range and an improved resistance to cross talk effects.

The detector circuit 123 may be configured to individually control the plurality of photosensors in the detector array 121. In some cases, the detector circuit 123 may comprise a plurality of pixel-level circuits such that the photosensor array can be configured at the pixel level. For example, one or more photodetectors, e.g. SPADs, corresponding to a pixel may be powered on/off or activated/deactivated according to the sensing pattern. In some cases, the operation parameters or operation status of a set of one or more photodetectors (e.g., SPADs) corresponding to a pixel may be configurable such that the amount of optical energy received by the set of one or more photodetectors (e.g., SPADs) may be controlled thereby adjusting the sensor output signal (e.g., amplitude of the signal).

The amount of optical energy to be converted into an electrical signal may be controlled by controlling the number of photodetectors (e.g., SPADs) activated in the set of SPADs corresponding to a signal, and/or by controlling the selection of a subset of light pulses from a set of the returned light pulses. In some embodiments, the detector circuit 123 may be configured to enable/turn on a subset of photodetectors from a set of photodetectors corresponding to a pixel for receiving an amount of optical energy. In some embodiments, the detector circuit 123 may be configured to select a number/count of returned light pulses or a subset of the returned light pulses to be accumulated for forming an output signal such that the corresponding total optical energy for generating an output signal can be controlled. For example, the detector circuit may comprise a pulse-detection circuit that is configured to convert the optical signal to an electrical signal. The pulse-detection circuit may be configured to generate a sensor output signal with configurable or controllable amplitude/strength by varying the amount of received photon energy that is converted into an electrical signal. In some cases, when the electrical signal is generated based on to a single light pulse, the pulse-detection circuit may generate a sensor output signal by accumulating different combinations of electrical signals for forming the sensor output signal. The sensor output signal may be generated based on an amount of optical energy of a selected subset of the consecutive returned light pulses or a combination of non-consecutive returned light pulses. Details about the detector circuit and the detector array are describe later herein.

In some embodiments, the emitting module 110 and the detecting module 120 may be communicatively coupled to a control unit 130. The control unit 130 may be configured to generate commands or control signals to the emitting module 110 and/or the detecting module 120, and receive output signals generated by the detecting module 120. Example commands may include commands that activate or deactivate a selected subset of emitters in the emitter array, specify a firing pattern of the emitting module, specify a sensing pattern of the detecting module synchronized with the firing pattern, specify one or more operational parameters for the detector array at pixel level (e.g., a subset of SPADs to be activated in a pixel or a selection of a subset of return signals for forming a sensor read-out), other operational parameters for the detector array such as bias, sampling duration, and signal processing. The control unit 130 may also receive sensor output signals from the detecting module 120 for further processing the data (e.g., final distance calculation or generating 3D image).

The control unit, functions, algorithms, operations, circuits or the methods may be implemented using software, hardware or firmware or a combination thereof. In some embodiments, the control unit may comprise one or more processors and at least one memory for storing program instructions. The processors may be a component of the Lidar system. Alternatively, the processors may be external to the Lidar system but in communication with the Lidar system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. The control unit may be a standalone device or system that is in communication with the Lidar system. Alternatively, the control unit may be a component of the Lidar system. The methods disclosed herein such as generating emission pattern and/or generating sensing pattern in response to a real-time condition can be implemented in hardware components or combinations of hardware and software such as, for example, ASICs, special purpose computers, or general purpose computers.

In some cases, the control unit 130 may implement or comprise multiple functional components such as a pattern generator and a signal analysis module. In some cases, the pattern generator may be configured to dynamically generate a firing pattern for a two-dimensional array of emitters such that a selected subset of emitters are activated at a time and emit light pulses based on a temporal profile specified by the firing pattern, and dynamically generate a corresponding sensing pattern for a two-dimensional array of photosensors by synchronizing the activation/deactivation of individual photosensors concurrently with the firing of corresponding emitters according to a pre-determined mapping relationship. The signal analysis module may be configured to process output signals received from the detecting module. Details about the pattern generator and the signal analysis module are described later herein.

Figure 2:
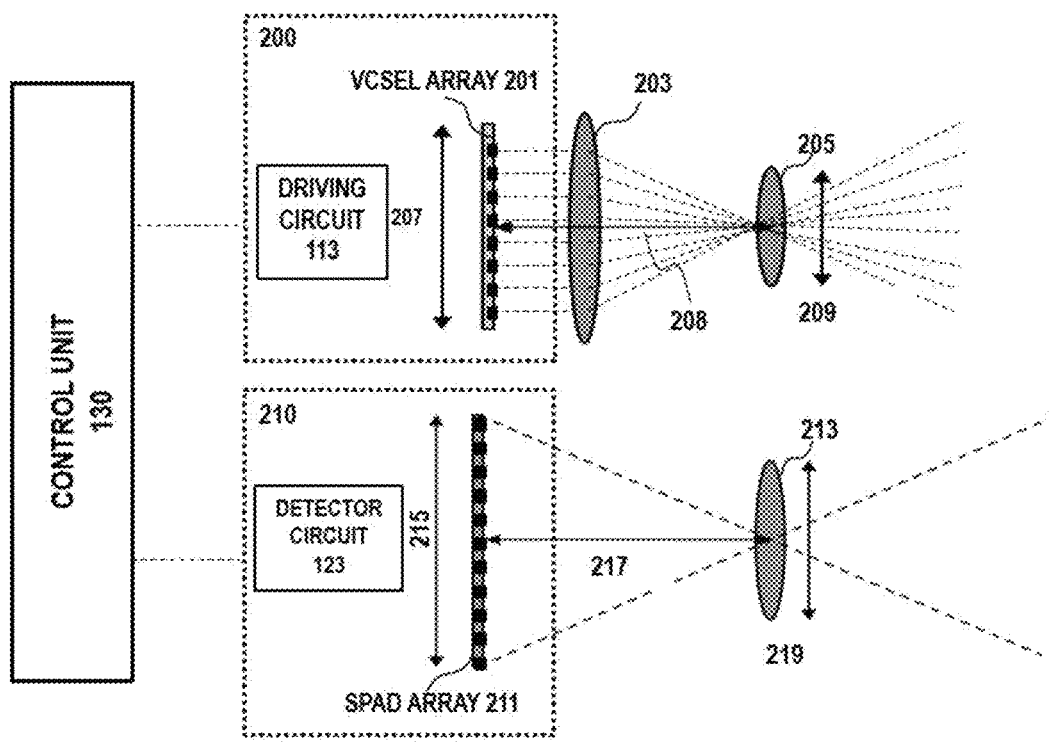
FIG. 2 shows an example of an emitter array and an example of detector array, in accordance with some embodiments of the invention.

FIG. 2 shows an example of an emitting module 200 and an example of a detecting module 210, in accordance with some embodiments of the invention. In some cases, the emitting module 200 may comprise a plurality of surface-emitting laser diodes 201 such as VCSELs array and a driving circuit 113. The emitting module 200 may optionally comprise or be in optical communication with the associated emitting optical system 203 such as an optical lens. In an embodiment, a diaphragm 205 may be placed at the focal point of the optical lens 203. In some cases, the detecting module 210 may comprise a plurality of individually addressable and controllable array of photosensors such as SPADs array 211 and the detector circuit 123. The detecting module 210 may optionally comprise or be in optical communication with the associated receiving optical system 213. The individual addressable and controllable emitter array or detector array may allow for a less complicated design of the emitting/emitting module (e.g., simple optical system).

In some embodiments, the VCSELs array 201 may be a two-dimensional m×n array of VCSELs having m number of rows and n number of columns. In some embodiments, a subarray of VCSELs may be grouped to form an emitter such that an m×n array of VCSELs may be configured as an a×b array of emitters (a<=m, b<=n). The VCSELs array may be arranged on a substantially flat surface and the laser beams emitted out of the VCSELs array may be collimated by the associated emitting optical system 203, 205. The plurality of VCSELs may or may not be angled. In some cases, the plurality of VCSELs may be fabricated on a flat substrate with pre-determined angles with respect to the substrate surface thereby effecting a direction of the light pulses emitted from the VCSELs. In alternative cases, the VCSELs array may be arranged on a non-flat surface, e.g., an overall curved surface with piecewise inclined partial surfaces and each VCSEL may have an angle (e.g., pitch angle, yaw angle, etc) with respect to the horizontal or vertical direction.

The dimension and/or configuration of the emitter array 207 (e.g., length, width, and/or diameter, pitch, effective area, VCSEL angle, etc), dimension and/or configuration of the detector array 215 (e.g., length, width, and/or diameter, pitch, effective area, etc), arrangement of the emitting optical system 203, 205 (e.g., aperture size 209, focal length 208) and the arrangements of the receiving optical system 213 (e.g., aperture size 219, focal length 217, location relative to the emitting optical system, etc) may be designed such that the return path of the returned light pulses can be predicted and the emitter array and the detector array may be mapped. The emitter array and the detector array may be mapped spatially such as with respect to the two-dimensional array plane (e.g., emitting surface). For instance, one or more VCSELs in the emitter array and one or more SPADs in the detector array may be mapped in the spatial domain with respect to the expected return signals.

In some cases, a mapping relationship between the emitting module and detecting module may be established. The mapping relationship may be fixed over time. The mapping relationship may change dynamically over time (e.g., performance drift of the Lidar system such as heat expansion). In some cases, the detector array may not move relative to the emitter array. Alternatively, the emitter array may be movable relative to the detector array. The emitting module or the detecting module may or may not comprise movable component (e.g., scanner, rotating platform) as long as the path of the returned light paths can be predicted or the expected signal location of the detector can be determined based on a pre-determined mapping relationship.

In the illustrated example, the VCSELs array 201 may have a size defined by dimensions 207 such as length, width, and/or diameter. For example, the VCSELs array may have a dimension (e.g., length, width, and/or diameter) of about 10 millimeter (mm) in diameter or 10 mm by 5 mm in length by width. The dimension of the VCSELs array can be in any suitable range, for example, from 0.1 mm to 100 mm. The VCSELs array may comprise at least one, two, three, four, five, six, seven, eight, nine, ten, or more columns or rows. The number of rows and columns may be constrained by the VCSEL size, spacing or pitch between neighboring VCSELs and the total dimension of the VCSELs array. In the case of surface-emitting laser diodes (e.g., VCSELs), the pitch or spacing of neighboring VCSELs may be about 50 micrometers (µm) or less, 40 µm or less, 30 µm or less, 20 µm or less, 10 µm or less, 1 µm or less, 0.1 µm or less, or any number greater than 50 µm. The aperture size 209 of the emitting optical system may have a length/width/diameter of about 20 µm or less, 10 µm or less, 1 µm or less, 0.1 µm or less, or any number greater than 20 µm. In some cases, the emitter array 200 may be designed such that the emitter array may include a greater density (e.g., thousands) of VCSELs or other laser diode. For example, the aperture of the VCSEL die (which is the active region where the lasing takes place) may be about 10 µm to about 20 µm in diameter. The die length may be reduced to the aperture diameter plus a few microns by reducing or eliminating wasted (non-active) area, and by retaining a few microns of combined chip length for the anode and the cathode contacts.

In some embodiments, an emitter of the emitter array may correspond to one or more VCSELs. In some cases, an emitter may be configured to transmit light pulses into a different field of view from that of its neighboring emitters. In some cases, light pulses transmitted from an emitter may correspond to a pixel or spot in the 3D image. The high density of VCSELs may allow for a set of VCSELs corresponding to a single emitter and the set of VCSELs may be addressable and individually controlled. This may beneficially provide a dynamic firing pattern with configurable resolution (e.g., temporal resolution and spatial resolution), light strength, beam shape or size such that beams for measurement in different distance ranges can be controlled individually without introducing interference. For example, the firing pattern may be a sparse pattern such that emitters corresponding to adjacent pixels may not be fired concurrently thereby reducing cross-talk or interference.

In some cases, an emitter may be mapped to a photosensor that corresponds to a particular pixel of resolution in a ranging measurement. Alternatively or in addition to, an emitter or beam spot may be mapped to a plurality of pixels in a ranging measurement. As described above, the mapping relationship may be based on the geometrical configuration of emitting module and the detecting module. For example, the mapping relationship may be based at least in part on the dimension and/or configuration of the emitter array (e.g., length, width, and/or diameter, pitch, effective area, VCSEL angle, etc), dimension and/or configuration of the detector array (e.g., length, width, and/or diameter, pitch, effective area, etc), arrangement of the emitting optical system (e.g., aperture size, focal length) and the arrangements of the receiving optical system (e.g., aperture size, focal length, location relative to the emitting optical system, etc).

In some embodiments, the mapping relationship may be updated and changed dynamically to account for changes in the Lidar system such as offset/drift caused by heat expansion of the system or changes in the performance of the Lidar system such as beam quality (e.g., shape or size of the beam). In some cases, updating the mapping relationship may comprise updating the address(es) of the set of photodetectors mapped to a given emitter (e.g., select a set of SPADs offset from the original set of SPADs to accommodate a drift, increase or reduce of the number of SPADs in an active region to accommodate the shape or size change of a beam spot), changing the signal processing related to the pixel (e.g., accumulate fewer or more light pulses for outputting a sensor output signal) and various others.

The photodetectors array, e.g., SPAD array 211 may receive returned light pulses through an associated optical system 213 that is configured to focus optical energy on the photodetectors array. In some embodiments, the SPAD array 211 may be arranged on a substantially flat substrate. In alternative cases, the photodetectors array may be arranged on a curved surface, which eases the optical requirements with regard to focusing and spot size/shape. In particular, by the arrangement of the photodetectors on a curved surface, the use of simple spherical optics may be sufficient compared to a-spherical optics.

The dimension and size of the detector array 215 may be designed such that one or more photosensors, e.g., SPADs may be assigned to an active region where a light spot arrives. For example, one or more photosensors may fit to the area defined by the size/shape of a beam spot incident on the detector array. As an example, the array may be designed to have a pitch or spacing of about 50 micrometers (µm) or less, 40 µm or less, 30 µm or less, 20 µm or less, 10 µm or less, 1 µm or less, 0.1 µm or less, or any number greater than 50 µm. The number of SPADs corresponding to a spot size/shape may be at least 2, 3, 4, 5, 6, 7, 8, 10, 15, 20, 25, 30, 35, 40, 45, 50, 60, 70, 80, 90, 100 or more. The high density of SPADs array may allow for a set of SPADs corresponding to a pixel. This may beneficially provide a dynamic sensing pattern with configurable resolution (e.g., temporal resolution and spatial resolution) or configurable output signal (e.g., amplitude) such that undesired optical effects (e.g., blind zone or cross-talk) may be avoided.

The SPAD array 211 may be a two-dimensional p×q array of SPADs having p number of rows and q number of columns. In some embodiments, a subarray of SPADs may be grouped to form a photosensor such that a p×q array of SPADs may be configured as a c×d array of photosensors (c<=p, d<=q). The number of columns/rows of the SPAD array 211 may not need to match the number of columns/rows of the VCSEL array 201. The SPAD array 211 may have a size defined by dimensions 215, such as length, width, and/or diameter. For example, the SPAD array 211 may have a dimension (e.g., length, width, and/or diameter) of about 15 mm (e.g., diameter), or 300 mm by 150 mm (e.g., length by width). The length or width of the SPAD array can be in any suitable range, for example, from 0.1 mm to 1000 mm. The SPAD array may comprise at least one, two, three, four, five, six, seven, eight, nine, ten, or more columns or rows. The number of rows and columns may be constrained by the SPAD size (e.g., about 10 µm), spacing or pitch between neighboring SPADs as described above. The aperture size 219 of the receiving optical system may have a length and/or width of about 20 µm or less, 10 µm or less, 1 µm or less, 0.1 µm or less, or any number greater than 20 µm.

In some embodiments, one or more photodetectors e.g., SPADs, may be grouped and correspond to a pixel or a sensing channel. A sensing channel may measure light pulses that corresponds to a pixel. In some cases, a group of photodetectors may form a photosensor that corresponds to a particular pixel of resolution in a ranging measurement. In some cases, a photosensor may comprise a set of photodetectors, e.g., SPADs with the capability to dynamically enable/disable individual pixels in the detector array, or enable/disable a subset of the set of SPADs corresponding to a given pixel. This may beneficially allow for controlling one or more operational parameters of a single photosensor in addition to turning on/off the entire photosensor thereby adjusting the performance of a pixel or output signal of a sensing channel (e.g., amplitude). As described above, one or more photosensors (e.g., a collection of SPADs) of the detector array may be mapped to one or more emitters of the emitter array such that the photosensor(s) may be configured to receive light pulses emitted from the corresponding emitter(s) and an sensor output signal may be produced by the corresponding sensing channel to generate a pixel value.

The photodetectors (e.g., SPADs) may have a high density whereas the spacing between adjacent active photosensors may be configurable such that cross-talk that may otherwise occur between adjacent sensing channels due to the tight pitch of the photodetectors array can be reduced. The spacing between adjacent active photosensors (e.g., pixel pitch) may be configured by enabling/disabling the corresponding sets of photodetectors such that the enabled sets of photodetectors are separated by an optimal spacing (e.g., vertical direction, horizontal direction). For example, in an array of SPADs where the adjacent SPADs is spaced apart by 50 microns, the pixel pitch may be about 200 microns or 400 microns.

In some cases, a beam spot may correspond to a plurality of pixels and each pixel may correspond to one or more SPADs. The high density of the photodetectors array may allow for a set of SPADs corresponding to a single emitter such that one or more operational parameters of a sensing channel can be adjusted. For example, a subset of the set of SPADs corresponding to a sensing channel/pixel may be enabled or powered on for receiving light pulses thereby adjusting the amount of optical energy used for forming an output signal. Additionally, a selection of a subset of return signals for forming a sensor readout may also be adjusted by signal processing (e.g., varying the number of light pulses accumulated for forming an output signal).

Figure 3:
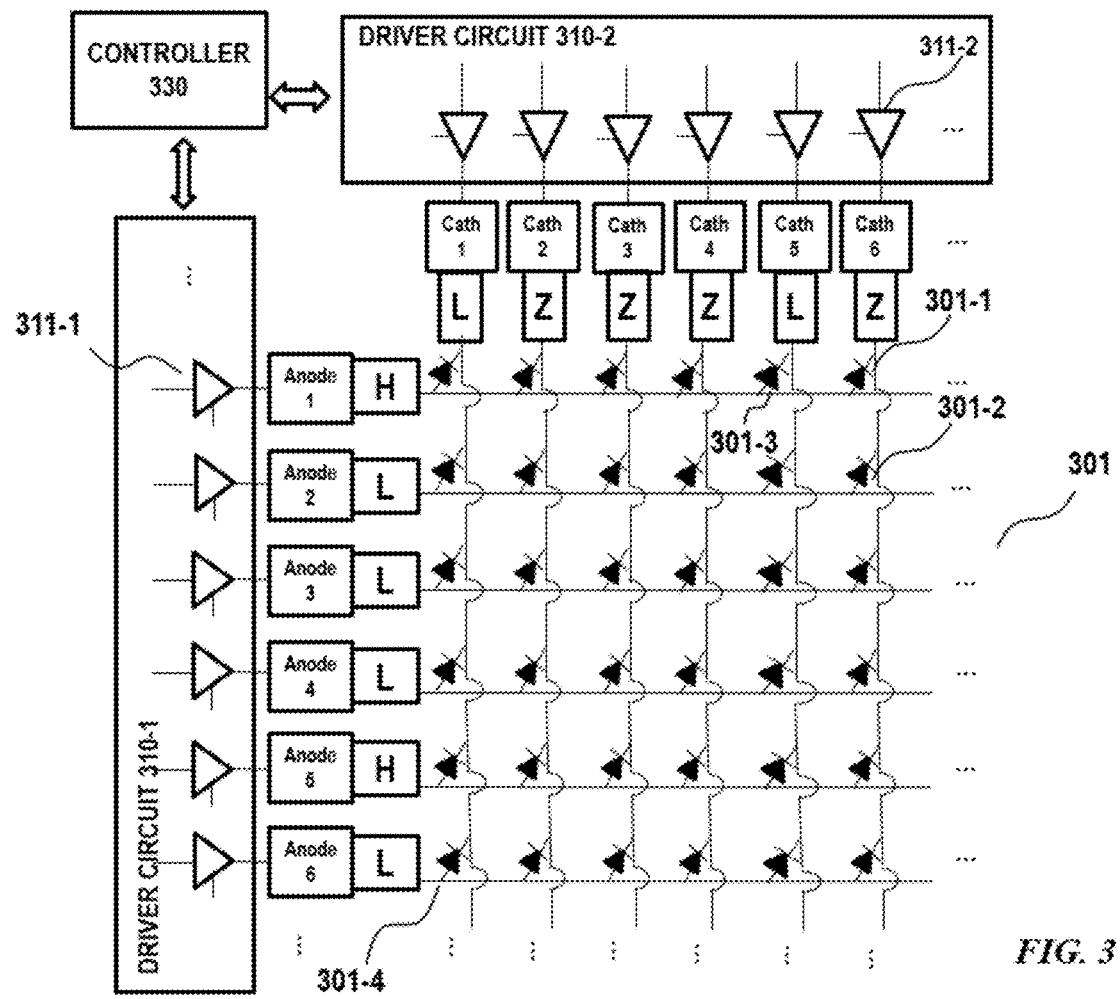
FIG. 3 shows an example of an emitter array with individually addressable and controlled emitters, in accordance with some embodiments of the invention.

FIG. 3 shows an example of an emitter array 301 with individually addressable and controlled emitters, in accordance with some embodiments of the invention. The emitter array 301 may comprise a two-dimensional array of lasers diodes 301-1, 301-2, 301-3, that each laser diode may be individually addressable and controlled by a driving circuit. In some cases, the driving circuit may comprise a row driver circuit 310-1 and a column driver circuit 310-2. The driving circuit can be the same as the driving circuit as described in FIG. 1. For example, a plurality of driver transistors may be arranged in an array such that each driver transistor 311-1, 311-2 may be connected with a column or row (or other subset) of the laser diodes, e.g., VCSELs, allowing for individual control of respective individual VCSEL.

The driving circuit 310-1, 310-2 may be semiconductor devices, such as field effect transistors (FET), FPGAs, ASICs, and the like, that manage the flow of current through emitter array. In the illustrated example, the driver transistors may be arranged in an array 310-2, 310-2 such that each driver transistor may be connected in series with a column or row (or other subset) of connected (or connections to a shared or common cathode/anode) VCSELs, allowing for individual control of respective individual VCSEL. Different triggering signals may be applied to the terminals of each VCSEL. As shown in FIG. 3. the triggering signals may be H (high voltage) or L (low voltage) or Z (high impedance). For example, the triggering signal applied to the positive or anode terminal of each VCSEL can be H (high voltage) or L (low voltage) and the triggering signal applied to the cathode of the VCSEL can be L (low voltage) or Z (high impedance) thereby controlling the activation of each VCSEL. For instance, when the anode terminal of the VCSEL 301-3 is connected to H and the cathode is connected to L, a large current may flow through the VCSEL 301-3 so the VCSEL is activated. In another instance, when the anode terminal of the VCSEL 301-1 is connected to H and the cathode is Z, the current flowing through the VCSEL 301-3 may be decreased and the VCSEL may not be activated. In a further instance, when the anode terminal of the VCSEL is connected to L and the cathode is Z or low, the current flowing through the VCSEL 301-3, 301-4 may be decreased and the VCSEL may not be activated. By individually varying voltage level of the anode or cathode, a VCSEL may be turned on/off quickly.

In some cases, introducing a high impedance may advantageously protect the VCSEL while allow for a quick turning on/off of the VCSEL. In some cases, when the anode is applied a low voltage and the cathode is applied a high voltage, the VCSEL may undergo a reverse breakdown due to the high reverse voltage. The provided emitter array may permit a VCSEL to be turned on by concurrently applying a high voltage level to the anode and a low voltage level to the cathode of the VCSEL, and turned off by concurrently applying a low voltage level to the anode and a high impedance voltage level to the cathode of the VCSEL. This may beneficially allow for a VCSEL being individually turned on and off quickly without undergoing a reverse breakdown. The VCSELs array can be the same as the VCSELs array as described in FIG. 2.

In some embodiments, an array of driver transistors (such as an array of the driver transistors 310-1 and an array of the driver transistors 310-2) may be assembled on the substrate close to the laser diodes and used to dynamically adjust or control the operation and/or emission power of individual VCSELs or subsets of the VCSELs in different areas of the emitter array. The emitter array may have any suitable connection configurations. The flexibility in the connection configurations may be used to control current and/or increase or maximize performance. For example, fewer or more driver transistors may be provided for control of respective VCSELs or groups of VCSELs (of various group sizes) and/or output power. In the illustrated example, each VCSEL may be individually addressable and controlled. In other cases, a set of VCSELs may be individually addressable and controlled.

Figure 5:
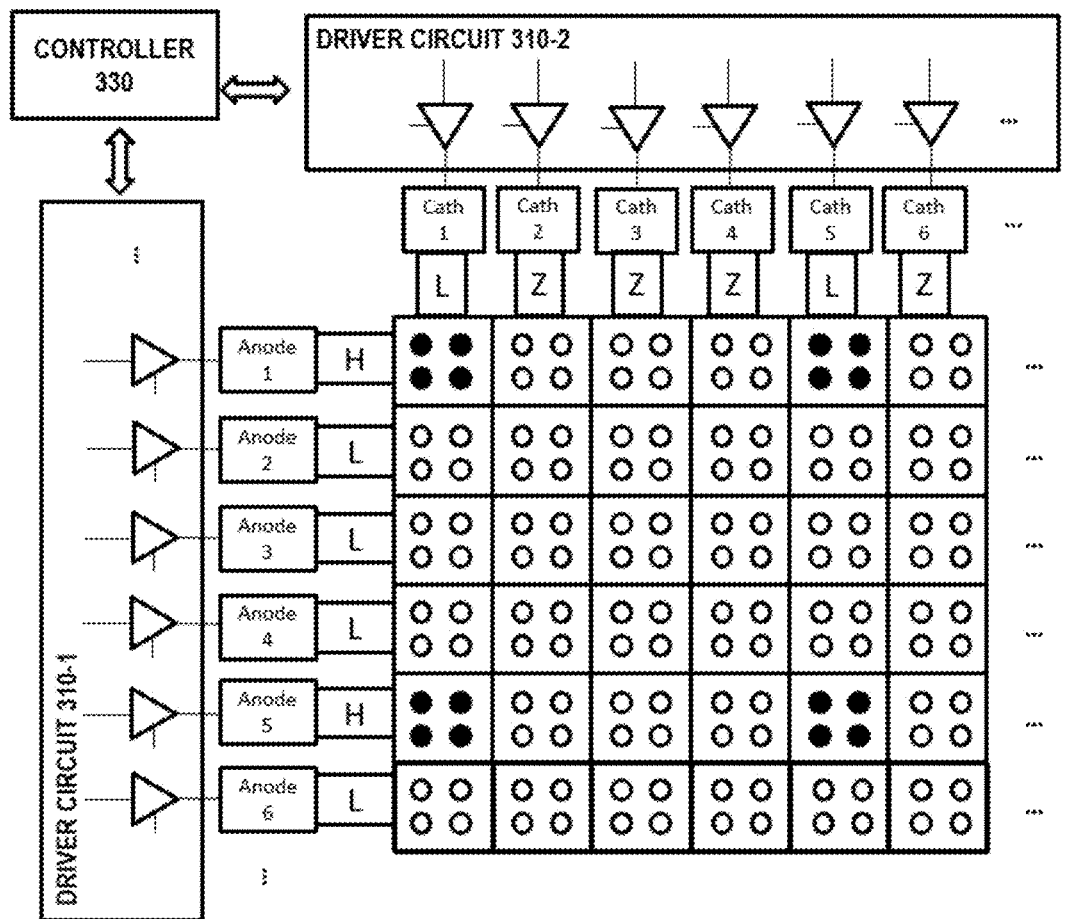
FIG. 5 illustrates an example of emitter array with a subset of emitters individually addressable and controlled.

FIG. 5 illustrates an example of emitter array with a subset of emitters individually addressable and controlled. For example, as shown in FIG. 5, multiple VCSELs may be grouped (e.g., 2×2 grid of VCSELs) to correspond to an emitter and/or an address. The group of VCSELs may be electrically-connected in series and/or parallel and the group may be individually addressable and controlled. In some cases, the group of VCSELs may correspond to an emitter, a pixel or spot in the 3D image. The groups of VCSELs may form an m×n array of emitters with m number of rows and n number of columns. For example, the driver circuit 310-1 may comprise m number of transistors connected to the anodes of the groups of VCSELs and the number of the anodes may correspond to the number of rows of the groups/emitters, i.e., m. Similarly, the driver circuit 310-2 may comprise n number of transistors connected to the cathodes of the groups of VCSELs and the number of the cathodes may correspond to the number of columns of the groups/emitters, i.e., n. The number of VCSELs in a group may or may not be the same across the emitter array. In some cases, the optical properties of the beam or light pulses generated by the group of VCSELs/emitter may or may not be the same as those generated by another group of VCSELs/emitter.

In some cases, the array of driver transistors may be individually addressable via column signals and row signals generated by the controller 330. The controller 330 can be the same as the control unit as described in FIG. 1. For example, the driver transistors (e.g., transistor 311-1, 311-2) may be individually activated (e.g., biased so as to be conducting) so as to vary power/current provided to a respective one or more VCSELs (e.g., VCSEL 301-1). In the illustrated example, one or more VCSELs corresponding to an address may be controlled by a pair of transistors connected to the anode and cathode of the one or more VCSELs functioning as a row selector and a column selector. In some embodiments, the driver circuit may receive control signals and/or command generated by the controller 330. The commands may include, for example, activating/deactivating respective VCSELs/emitters specified by an address, specifying a firing pattern or one or more parameters of a firing pattern (e.g., addresses of VCSELs/emitters to be activated, temporal profile of a multi-sequence emitted by the selected emitter, etc) or others.

In some cases, the driver circuit may comprise other electronic elements such as switches, energy storage devices (e.g., capacitors or similar energy storage devices) for faster pulse generation. In some cases, the driver circuit may comprise a plurality of charging units configured to charge the energy storage element sequentially or collectively. The plurality of charging units may be controlled to provide an amount of electrical energy to the energy storage element in response to control signals generated by a controller 330.

As an example, the peak power of output beam generated by an emitter (e.g., selected by an address) may be about 10 mW, 100 mW, 1 W, 10 W, or any other suitable average power. As an example, output beam may have an average power of approximately 1 mW, 10 mW, 100 mW, 1 W, 10 W, or any other suitable average power. As another example, output beam may include pulses with a pulse energy of approximately 0.1 µJ, 1 µJ, 10 µJ, 100 µJ, 1 mJ, or any other suitable pulse energy. As another example, output beam may include pulses with a peak power of approximately 10 W, 100 W, 1 kW, 2 kW, 5 kW, 10 kW, or any other suitable peak power.

The power of the output beams may be controlled at the pixel/emitter level allowing for measurement in various ranges (e.g., far-field, near-field). The power of output beams may be adjusted by adjusting distribution of the laser diodes and/or the temporal profile of the light pulses generated by the respective emitter/laser diodes. For example, the distribution of the laser diodes on the surfaces of the substrate may be selected and/or the operation of the laser diodes may be dynamically adjusted or otherwise controlled (via the transistors) to reduce optical power density, providing both long range and eye safety at a desired wavelength of operation (e.g., about 905 nm for GaAs VCSELs; about 1500 nm for InP VCSELs).

The flexibility in the emitter array arrangement and the configurability of the emitter array may provide improvement in the performance of the Lidar system. For example, the spacing between active emitters may be optimized to provide thermal management and improve heat dissipation during operation. Additionally, the firing pattern may be determined thereby providing low operational temperature.

The circuit embodiment and connection configurations of FIG. 3 is merely an example of how the array of emitters may be configured to be individually addressable. However, the embodiments described herein are not limited to this particular arrangement. Other wiring connections or layouts of the circuitry can also be employed to allow for a highly configurable and adaptive emitting module.

In some cases, a firing pattern of the emitting module may be generated dynamically to accommodate different measurement ranges, channel conditions (e.g., SNR), environment complexity, eye-safe requirement and the like. For example, the firing pattern may specify a temporal profile that a first light pulse having a low peak power and a second light pulse having a high peak power and the two light pulses may be separated by a time interval greater than a predetermined time threshold (e.g., 10 ns) such that when an object is detected within a distance (e.g., 1.5 m) corresponding to the time threshold, the second light pulse with the higher peak power may not be fired. In another example, a greater fraction of pulse energy may be supplied to selected subset of the VCSELs in order to change the far field pattern of the emitted output beam, such that the directions corresponding to a far field measurement may receive a greater amount of power. However, in some cases, such high power light pulses for long distance or far-field measurement may cause undesired effects such as interference or over-exposure of adjacent pixels in the 3D image. In such cases, a sparse firing pattern may be generated such that adjacent pixels may not be fired concurrently thereby eliminating the aforementioned optical effects.

Figure 4:
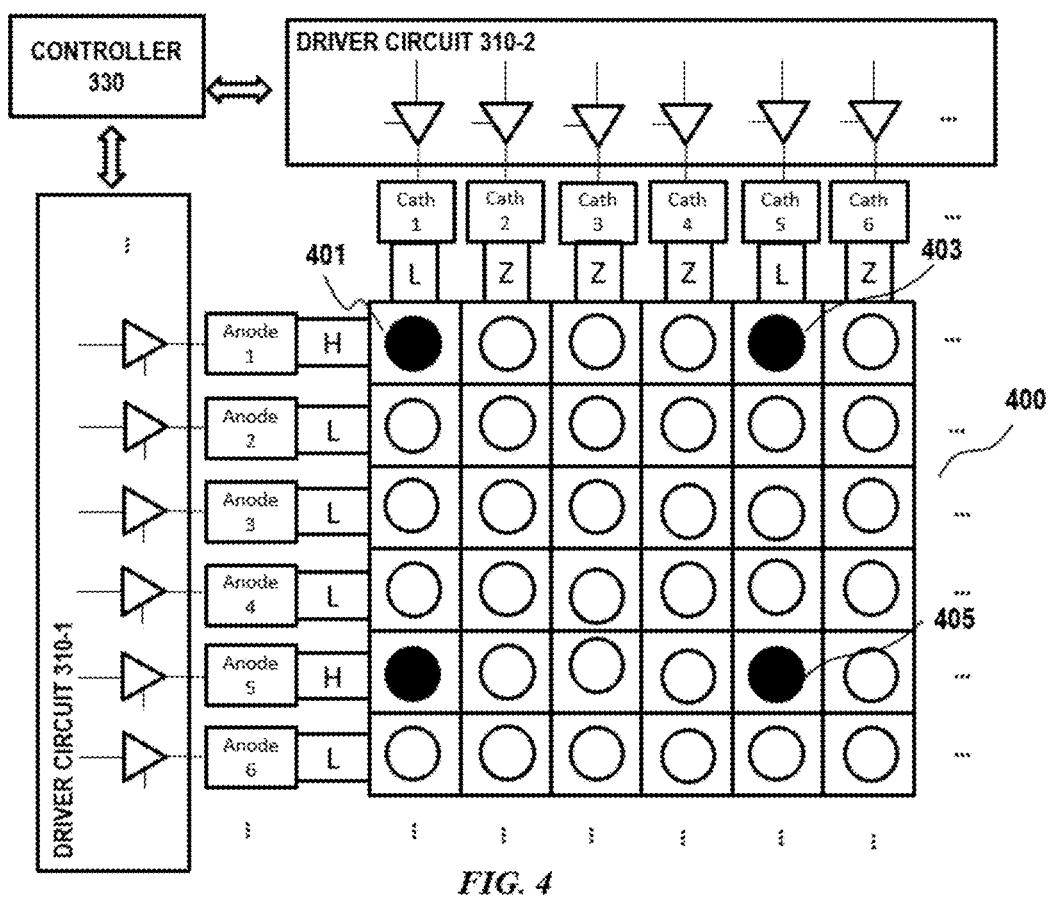
FIG. 4 schematically illustrated a sparse firing pattern of the emitting module.

FIG. 4 schematically illustrated a sparse firing pattern of the emitting module. As similarly discussed above with reference to FIG. 3, an emitter in the emitter array may be individually addressable or controlled. The emitter array may be controlled to fire light pulses according to a firing pattern. In some cases, the firing pattern may be sparse in the two-dimensional spatial domain (e.g., the emitter array plane) at a given point in time such that cross-talk between adjacent signal channels may be reduced and the energy efficiency may be improved. For example, emitters corresponding to adjacent pixels may not be fired concurrently such that the cross-talk or interference may be reduced. As illustrated in the example, at a given point in time, the emitters 401, 403, 405 may be activated concurrently and the active emitters 401, 403, 405 may be separated by an optimal spacing such that an overlap or interference between the measurement light beams concurrently fired by these emitters may be significantly reduced. The active emitters may be separated by a spacing along the row direction (e.g., emitters 401, 403) or the column direction (e.g., emitters 403, 405). The emitters activated at the same time may be spaced apart by one or more inactive emitters.

As described above, the firing pattern may define the activation or deactivation of a selected set of emitters for firing light pulses simultaneously. The firing pattern may also specify a temporal profile of a multi-sequence emitted by an individual emitter. The firing pattern may be generated by the controller 330 as described elsewhere herein and control signals may be transmitted to the driver circuit (e.g., 310-1 and 310-2) to control the emission of light pulses generated by each individual emitter.

A sensing pattern for the detecting module may be generated based on a pre-determined mapping relationship between the emitter array and the detector array, and one or more real-time conditions. The sensing pattern may define a plurality of parameters for controlling the detector array. For example, the sensing pattern may specify the address(es) of photosensor(s) (i.e., one or more SPADs corresponding to a pixel) to be activated for simultaneous measurement, operational parameters for the detector array at pixel level (e.g., a subset of SPADs to be activated in a pixel or a selection of a subset of return signals for forming a sensor read-out), and other operational parameters for the detector array such as bias, sampling duration, and signal processing.

Figure 6:
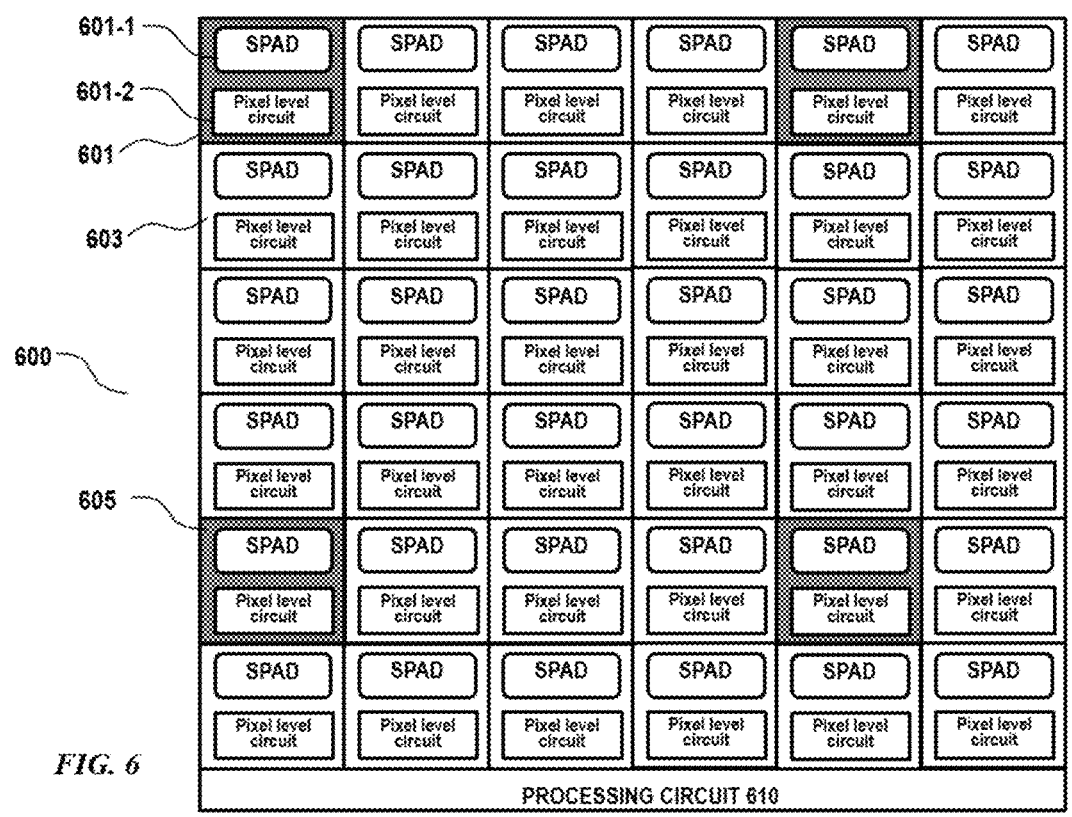
FIG. 6 shows an example of a detector array with individually addressable and controlled photosensors, in accordance with some embodiments of the invention.

FIG. 6 shows an example of a detector array 600 with individually addressable and controlled photosensors, in accordance with some embodiments of the invention. The detector array 600 may comprise an array of photosensors 601, 603, 605, that each photosensor may be individually addressable and controlled by a pixel-level circuit 601-2. For example, each photosensor 601 may be connected with a pixel level circuit, allowing for individual control of respective photosensor. The output signals produced by a photosensor may be transmitted to a processing circuit 610 to generate a pixel value (e.g., amplitude) or for further signal processing (e.g., a distance measurement).

As described elsewhere herein, a photosensor may correspond to a particular pixel of resolution in a ranging measurement. A detector may comprise one or more photosensors each of which can convert light into an electrical signal. A photosensor may include a plurality of photodetectors, such as single-photon avalanche diodes (SPADs). A photosensor may correspond to a particular pixel of resolution in a ranging measurement. The detector may be provided with the capability to dynamically enable/disable individual pixels in the array and/or dynamically enable/disable a subset of SPADs in a pixel thereby configuring the detector at the pixel level or sub-pixel level. In some cases, a photosensor may comprise a SPADs array that may be individually addressable and controlled such that the SPADs array corresponding to a pixel can be powered on/off. Alternatively or in addition to, one or more operational parameters of an individual photosensor may be controlled or dynamically configured by powering on/off a subset of one or more SPADs selected from a SPDAs array corresponding to a pixel. The photosensor, detector array and photodetectors can be the same as those describe elsewhere herein.

Figure 7:
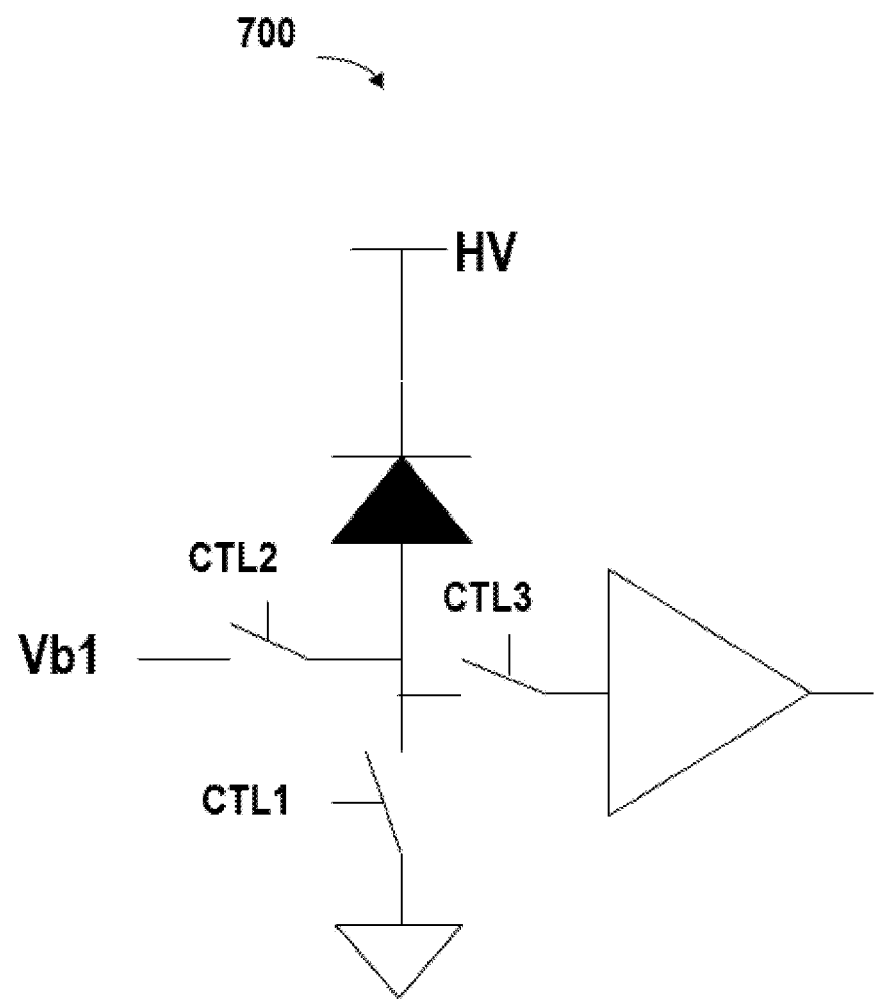
FIG. 7 shows an example of a photosensor comprising a SPAD that can be enabled/disabled by a pixel-level circuit.

The pixel level circuit 601-2 may be electrically connected with a photosensor to enable/disable an individual pixel in the detector array 600. The pixel level circuit 601-2 may be connected with one or more SPADs that correspond to a pixel. In the illustrated example, a photodetector, e.g., SPAD 601-1 may be individually controlled by the pixel level circuit 601-2 and output a sensor output signal. FIG. 7 shows an example of an individually controlled photosensor 700 comprising a SPAD that can be enabled/disabled by a pixel-level circuit. Each SPAD may have an analog front end circuit for biasing, quenching, and recharging. SPADs are normally biased with a biased voltage above the breakdown voltage. In the illustrated example, a SPAD may be disabled or powered-off by lowering the SPAD's bias voltage below breakdown such as through the control switch CTL2 (CTL2 is on), switch CTL3 (CTL3 is off) and CTL1 (CTL1 is off). Similarly, the SPAD may be enabled or powered-on by switching on CTL1 and CTL3, and switching off CTL2. By selectively disabling SPADs corresponding to inactive emitters, power consumption of the system may be reduced.

Referring back to FIG. 6, in the illustrated example, a plurality of pixel level circuits may be arranged in an array such that each pixel level circuit may be connected with a respective photosensor that comprises a set of one or more SPADs. The SPADs array can be the same as the SPAD array as described in FIG. 2.

In some embodiments, the pixel level circuits may be assembled on the substrate close to the SPAD array and used to dynamically turn on/off or enable/disable a respective set of one or more SPADs or subsets of the SPADs in different areas of the detector array. The detector array may have any suitable connection configurations. The flexibility in the connection configurations may be used to configure the resolution of the SPADs array. For example, the array of individually addressable and controlled SPADs may be further grouped such that a group of SPADs may form a pixel. This may beneficially allow for finer configuration of the performance of a photosensor/pixel or operational parameters with respect to a pixel.

The detecting module may be configured or dynamically adjusted at various levels. For example, the detecting module may have configurable power levels by enabling/disabling selected sets of photosensors, adjustable dynamic ranges or high dynamic ranges (e.g., sparse sensing pattern to reduce cross-talk) or configurable operational parameters at the pixel level (e.g., activing a selected subset of photodetectors in a pixel, accumulating a selected subset of returned light pulses received by a photosensor for forming an output signal). The individually addressable and controlled photodetector may also provide flexibility in configuring and modifying the sensing pattern to accommodate real-time conditions, including but not limited to, accounting for drift introduced by heat expansion, accounting for variation of returned light flux, accounting for detected objects in the environment or eye-safe requirement.

Figure 8:
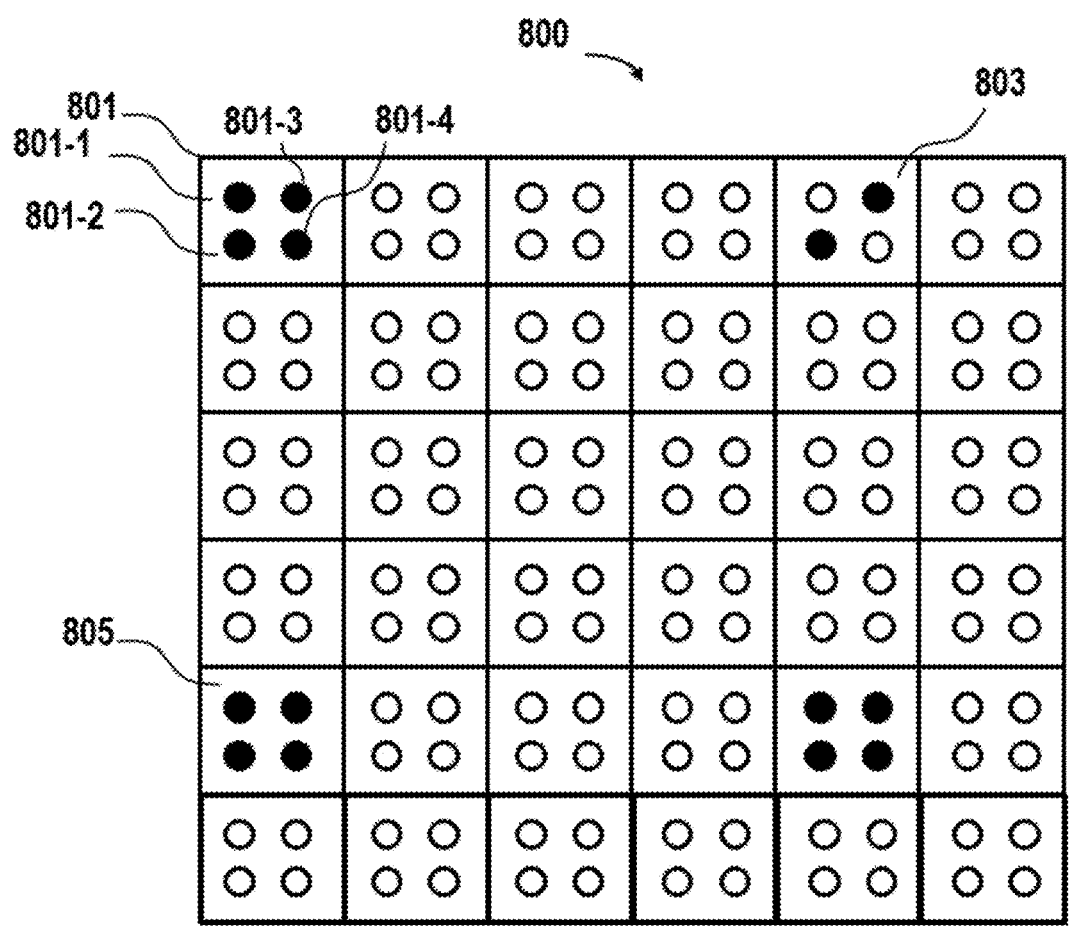
FIG. 8 illustrates an example of a detector array comprising at least a set of SPADs that are grouped to form a pixel.

FIG. 8 illustrates an example of a detector array 800 comprising at least a set of photodetectors, e.g., SPADs that are grouped to form a pixel. In some embodiments, each photodetector (e.g., SPAD) may be individually addressable and controlled. For example, a set of individually addressable SPADs 801-1, 801-2, 801-3, 801-4 may behave as a single pixel and the output signals generated by the set of SPADs 801 may be transmitted to a processing circuit (e.g., processing circuit 610 in FIG. 6) to generate a pixel value (e.g., amplitude). In some cases, each SPAD 801-1, 801-2, 801-3, 801-4 in the SPADs array 801 may be electrically connected with a pixel level circuit as described in FIG. 6, and the set of corresponding pixel level circuits may receive control signals (from a controller) and transmit output signals to a processing circuit acting as single pixel. In the case when multiple SPADs are grouped to behave as a pixel, each circuit associated with a SPAD may also be referred to as sub-pixel level circuit. Alternatively or in addition to, the set of SPADs 801-1, 801-2, 801-3, 801-4 may be electrically connected with a pixel level circuit same as the circuit as described in FIG. 6 such that the SPADs array 801 may be addressable and controlled. In such case, an address may correspond to a set of SPDAs such as a 2×2 grid of SPADs 801-1, 801-2, 801-3, 801-4. The group or set of SPADs may be electrically-connected in series and/or parallel and the group may be individually addressable and controlled. The group of SPADs 801, 803, or 805 may correspond to a photosensor, a pixel or spot in the 3D image.

In some cases, a group of SPADs may correspond to a region in the detector array for receiving returned light pulses. The group of SPADs may be enabled or disabled thereby varying the active region for output signals. The area, shape and/or location of the active region may be varied or configured by controlling the selection of SPADs to be enabled. In some cases, by changing the size of SPADs array (e.g., number of SPADs) corresponding to an active region, an area and/or shape of the active region may be adjusted. The active region or a sensing pattern specifying the active region may be dynamically adjusted or configured during operation of the Lidar system.

Figure 9:
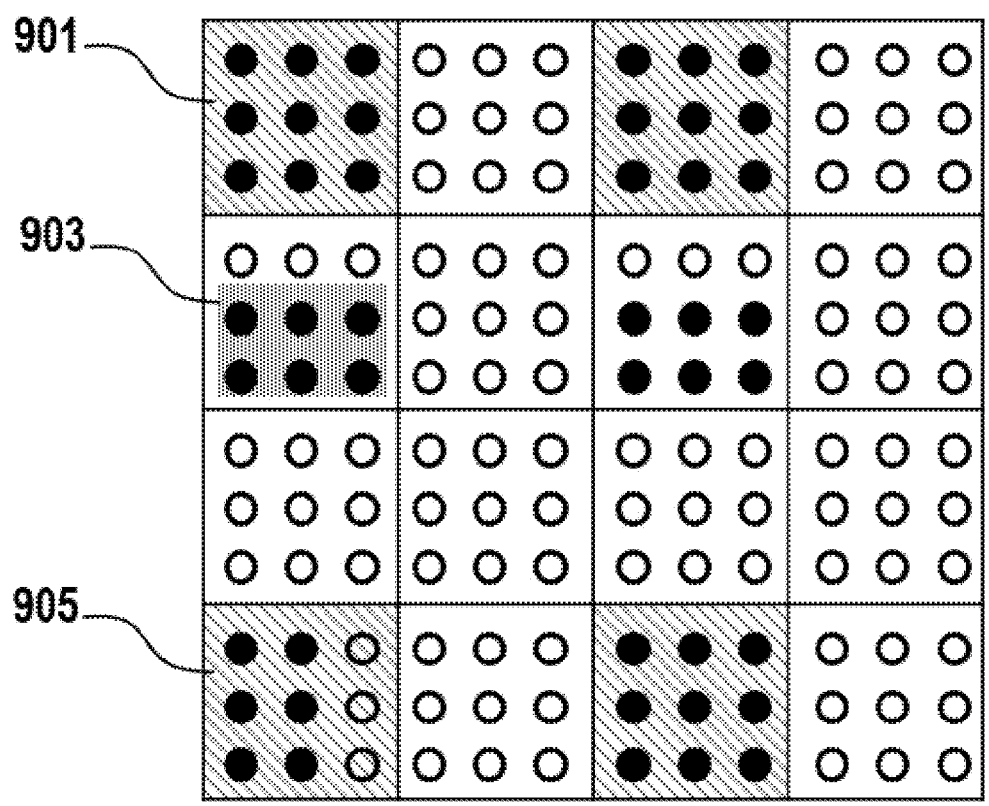
FIG. 9 illustrates an example of groups of SPADs array with each group individually configurable, addressable and controlled.

FIG. 9 illustrates an example of groups of SPADs array with each group individually configurable, addressable and controllable. For example, a 3×3 array of SPADs may be grouped to form a pixel. The area of the active region 901 may be greater than that of the active region comprising a 2×2 array. In some cases, by activating a selected subset of SPADs from a given group, a shape or area of the active region may be controlled. For instance, the shape and area of the active region may be changed by selecting a subset of SPADs from the 3×3 array 903. This may beneficially accommodate drift of the beam quality (e.g., shape or spot size of the beam). In some cases, by activating/deactivating different groups of SPADs array, the location of the active region can be controlled. The flexibility of controlling the location of active region may beneficially accommodate detection drift caused by heat expansion. The number of SPADs to form a group can be configurable without alternating the wire connection. This may be beneficial to dynamically adjust the area of the active region or configure the image resolution.

In some cases, one or more photodetectors (e.g. SPADs) corresponding to a pixel may be activated/deactivated according to a sensing pattern. For example, as illustrated in FIG. 8, the groups of SPADs (i.e., photosensors) 801, 803, 805 may be enabled concurrently for detecting light pulses. In some cases, the activated photosensors 801, 803, 805 may be separated by an optimal spacing such that an overlap or interference between the adjacent sensing channels may be significantly reduced. The enabled photosensors may be separated by a spacing in the row direction (e.g., groups 801, 803), the column direction (e.g., groups 801, 805) or both. The selection of active groups or photosensors to be enabled may be synchronized with the firing/emission pattern.

In some situations, the operational status of a set of photodetectors in a group may be individually controlled thereby controlling the operational parameters of the photosensor/pixel. For example, when the light flux reaches certain levels, e.g., too low or too high, fewer or more photodetectors in a group may be enabled. For instance, the operation of a set of photodetectors (e.g., SPADs) corresponding to a pixel may be configurable such that the amount of optical energy received by the set of photodetectors (e.g., SPADs) may be adjusted thereby controlling the sensor output signal (e.g., amplitude of the output signal). For example, the active region 801 may be configured with more active SPADs compared to the active region 803 when the light flux received by the active region 803 is higher.

Referring back to FIG. 6, the output signals generated by a photosensor may be transmitted to a processing circuit 610 to generate a pixel value (e.g., amplitude) or generate a measurement. The amplitude of the output signal may be proportional to the number of detected photons of optical energy received by the photosensor/group. This may allow for a high dynamic range photosensor. For example, the amount of optical energy to be converted into at least an electrical signal may be varied by varying the number of SPADs powered-on in the set of SPADs corresponding to a pixel, and/or by varying the number of light pulses selected from a set of the returned light pulses. The number of SPADs or a subset of SPADs selected from a group for outputting a sensor signal may be controlled by the pixel level circuit or the controller as described elsewhere herein. The number/count of returned light pulses that are accumulated for forming an output signal and/or the selection of a subset of the returned light pulses may be determined or controlled by the processing circuit (e.g., processing circuit 610) or a pulse-detection circuit of the detector array.

In some cases, the detector circuit may comprise a pulse-detection circuit that is configured to convert the optical signal to an electrical signal. The pulse-detection circuit may be configured to generate a sensor output signal by varying the amount of received photon energy that is converted into at least one electrical signal. Alternatively, when the electrical signal corresponds to a single light pulse, the pulse-detection circuit may generate a sensor output signal by accumulating different combinations of electrical signals for forming the sensor output signal. In some cases, the pulse-detection circuit may generate a sensor output signal which is indicative of an amount of optical energy associated with a selected subset of the returned light pulses.

In some cases, the pulse-detector circuit may comprise a counter that may use binary signal to count the number of photodetectors for a given pixel that have been triggered by one or more photons. The pulse-detector circuit and/or the processing circuit may accumulate selected subset of returned light pulses. For example, for each photodetector or grouping of photodetectors corresponding to a pixel, a memory (e.g., SRAM) of the circuit (e.g., ASIC or FPGA) may accumulate counts of detected photons over a time window that corresponds to a subset of pulses from a multi-pulse sequence. In some cases, the pulse-detection circuit may implement per-pixel time-to-digital converter (TDC) architecture, TDC sharing architecture or TDCs that are shared in a dynamic reallocation scheme or any other suitable architecture. In some cases, a readout efficiency may be improved with an event-driven readout method that only the valid events will be transmitted off-chip (e.g., to the system controller). This may be enabled by synchronizing a sensing pattern and emission pattern of the Lidar system.

In some cases, the pulse-detection circuit may be coupled to the processing circuit 610. Alternatively, the pulse-detection circuit may be an integral part or a component of the processing circuit 610. The processing circuit 610 may be in communication with a controller of the Lidar system to receive data (e.g., operational parameters indicative of accumulation of selected returned light pulses, etc) and transmit data to the controller for further signal processing (e.g., final distance calculation or generating 3D image). In some cases, the processing circuit 610 may be assembled on the same substrate with the detector array (e.g., using CMOS technology or be connected to the detector array. The processing circuit 610 may be an integrated circuit such as field programmable gate arrays (FPGAs), application specific integrated circuit (ASIC) or digital signal processors (DSPs). The processing circuit may receive readout from the detector array and perform signal processing. The processing circuit may implement suitable function modules such as matched filters and peak detection processing to identify return signals in time. As described above, the processing circuit may improve readout efficiency by employing an event-driven readout method to only transmit valid events to the system controller (e.g., control unit 130 in FIG. 1) for further signal processing. This may be enabled by receiving a sensing pattern from the controller and only read the sensor output from the enabled photosensors.

Figure 10:
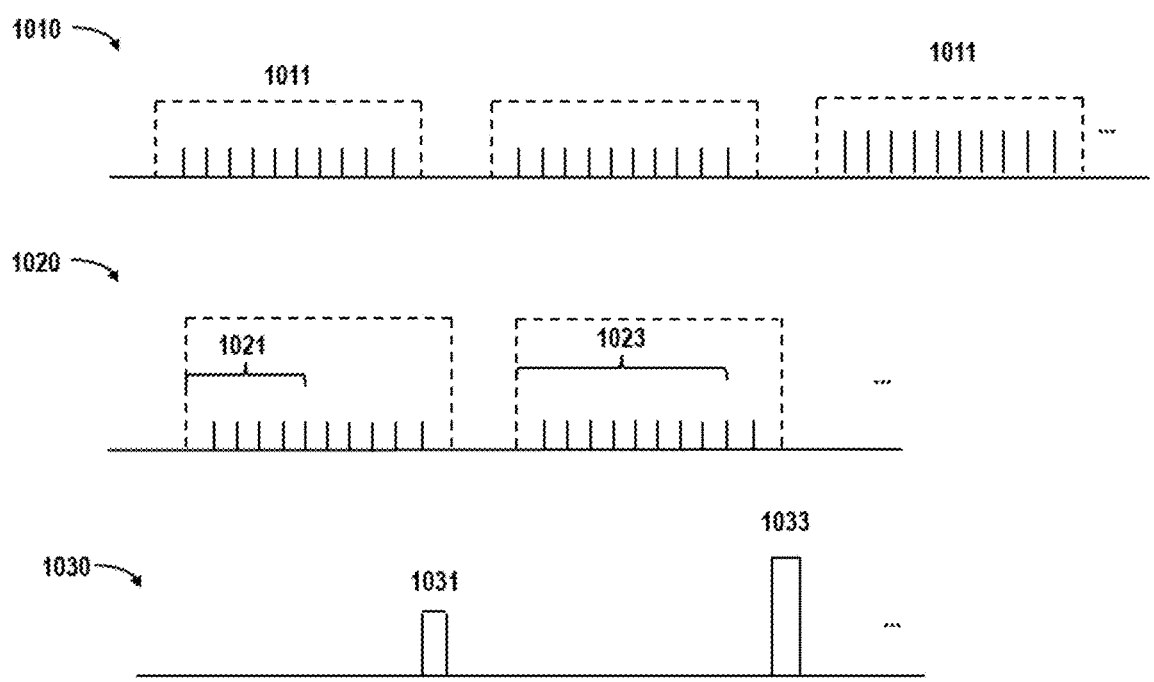
FIG. 10 shows an example of accumulating a subset of returned pulses selected from a returned multi-pulse sequence to form a sensor output signal, in accordance with some embodiments of the invention.

As described above, the number/count of returned light pulses that are accumulated for forming an output signal and/or the selection of a subset of the returned light pulses may be configured or altered dynamic during measurement. FIG. 10 shows an example of accumulating a subset of returned pulses selected from a returned multi-pulse sequence 1020 to form a sensor output signal 1030. A multi-pulse sequence 1011 may comprise multiple pulses. The multi-pulse sequence 1011 may be measurement signal emitted from an emitter (e.g., a VCSEL or a set of VCSELs) of an emitter array. A multi-pulse sequence may be emitted to a spot in a 3D space or emitted along substantially a same direction. The multi-pulse sequence or at least a portion of the multi-pulse sequence may be used to generate a measurement signal. The multi-pulse sequence may a sequence (of pulses) modulated according to a pre-determined temporal profile. The returned pulses may be received in an active region in the detector array that corresponds to one or more individually addressable photosensors. A multi-pulse sequence may comprise any number of pulses. For example, at least one, two, three, four, five, six, seven, eight, nine, ten or more pulses may be generated within a short period of time and form a multi-pulse sequence. The duration may be, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 μs, 2 μs, 3 μs, 4 μs, 5 μs. The duration of different multi-pulse sequences may or may not be the same. In some cases, the duration of consecutive multi-pulse sequences can be different. The number of pulses in successive multi-pulse sequences may or may not be the same. The multiple pulses may have varied amplitude or constant amplitude within a multi-pulse sequence 1011.

In some cases, the subset of returned pulses for forming a sensor output signal may be selected based on one or more parameters. The one or more parameters may determine an amplitude or intensity of a sensor output signal. The one or more parameters may be generated by a computing unit such as a controller of the Lidar system (e.g., control unit 130 in FIG. 1 or controller 330 in FIG. 3). The one or more parameters may be specified by the sensing pattern of a detecting module. In some cases, the one or more parameters may be determined according to the temporal profile of the multi-pulse sequence and one or more real-time conditions. As described above, the temporal profile of a sequence may be defined by the number of pulses, time intervals, duration of the sequence, amplitude of the pulses, or a combination thereof in a sequence. The one or more real-time conditions may comprise an estimated measurement range (e.g., far-field, near-field), an object detected in the near field and the like. In some cases, the number of pulses or the selection of pulses accumulated for forming a signal may be determined based on the estimated detection range. For example, greater number of pulses may be accumulated for measurement in long distance and smaller number of pulses may be accumulated for measurement in short distance or higher reflection scenarios.

The one or more parameters may comprise, for example, a parameter indicative of a selected subset of pulses. For instance, the one or more parameters may comprise the count of pulses accumulated for forming a sensor output signal or a parameter indicating a combination of pulses selected for forming a sensor output signal. The one or more parameters can include any other factors (e.g., a time window during which returned light pulses are received) that may determine the total optical energy of the selected subset of pulses. For example, when the multiple pulses in a multi-pulse sequence have constant amplitude, the amount of optical energy converted to a sensor output signal may be determined by the number of pulses. For instance, as shown in FIG. 10, a number/count of the returned light pulses 1020 may be selected and accumulated for forming a sensor output signal. The number/count of light pulses selected from an individual multi-sequence 1021, 1023 may be individually controlled such that the sensor output signal 1030 may have adjustable amplitude/intensity 1031, 1033. In some cases, when the multiple pulses in a multi-pulse sequence have varied amplitude, the amount of optical energy converted to a sensor output signal may be determined by selecting a combination of pulses from the returned light pulses. In such case, by selecting different combinations of light pulses, accumulated amount of optical energy of numerous values can be formed. The subset of light pulses selected for forming a sensor output signal may or may not be consecutive train of light pulses.

In some embodiments, an adaptive control mechanism for a Lidar system may be provided such that the emitting module and/or receiving module of the Lidar system are capable of adapting to various real-time conditions or requirements. The adaptive control mechanism may be configured to control the firing pattern of a two-dimensional array of light emitters such as by activating only a subset of light emitters at a time, and control the sensing pattern of a two-dimensional array of photosensors by synchronizing the activation/deactivation of individual photosensors concurrently with the firing of corresponding light emitters. In some cases, the sensing pattern may be synchronized with the firing pattern in terms of a location with respect to the emitter/detector array and one or more operational parameters.

In some embodiments, the adaptive control mechanism may provide a pattern generator configured to generate an emission pattern for a two-dimensional array of emitters such that a selected subset of emitters are activated at a time and each emitter emits light pulses based on a temporal profile specified by the emission pattern, and generate a corresponding sensing pattern for a two-dimensional array of photosensors by synchronizing the activation/deactivation of individual photosensors concurrently with the firing of corresponding emitters according to a pre-determined mapping relationship. The mapping relationship for synchronizing the emission pattern of the emitting module and the sensing pattern of the detecting module may define a mapping relationship between the emitters array and the detector array in both spatial domain (e.g., the photosensor(s) is associated with an emitter) and temporal domain (e.g., operational parameter(s) of an individual photosensor is configured based on the temporal profile such as amplitude of the light pulse).

Figure 11:
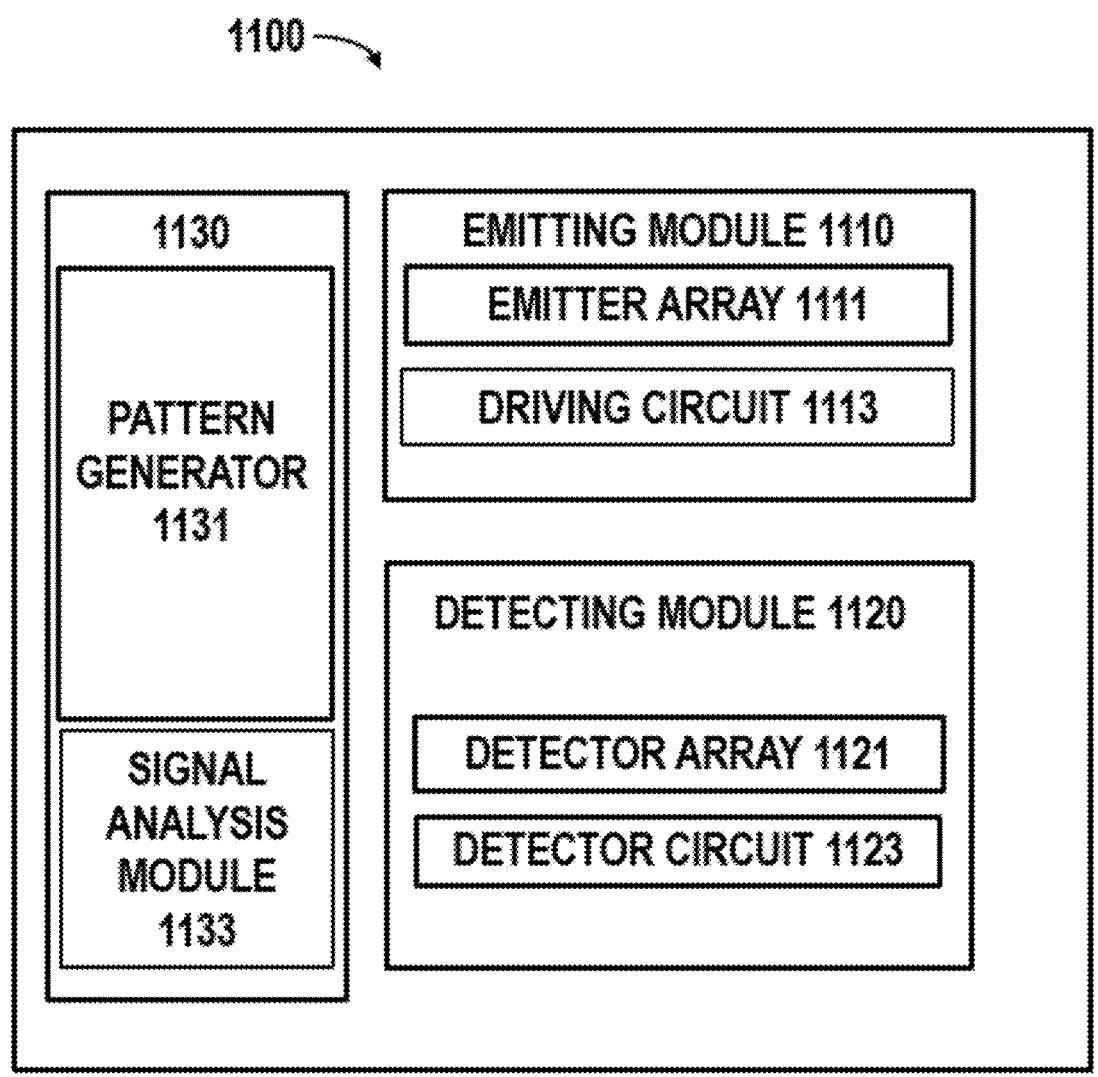
FIG. 11 schematically illustrates a Lidar system comprising a pattern generator, in accordance with some embodiments of the invention.

In some embodiments, the adaptive control mechanism may comprise an adaptive emitting module and an adaptive receiving module that are in communication with a pattern generator. FIG. 11 schematically illustrates a Lidar system 1100 provided with an adaptive control mechanism, in accordance with some embodiments of the invention. In some embodiments, adaptive control mechanism may comprise a pattern generator 1131 that is in communication with an emitting module 1110, and a detecting module 1120. The emitting module 1110 may comprise an emitter array 1111 and a driving circuit 1113. The emitting module and the components of the emitting module can be the same as those described in FIG. 1 or anywhere else herein. The detecting module 1120 may comprise a detector array 1121 and a detector circuit 1123. The detecting module and the components of the detecting module can be the same as those described in FIG. 1 or anywhere else herein. In some embodiments, the pattern generator 1131 may be implemented by a controller or control unit 1130 of the Lidar system. The control unit 1130 can be the same as the control unit as described in FIG. 1. In some embodiments, the control unit may further comprise a signal analysis module 1133 that is configured to receive output signals from the detector circuit 1123.

The pattern generator 1131 may be configured to dynamically generate a firing/emission pattern and a sensing pattern. The firing pattern may be transmitted to the emitting module for controlling the emitter array as described above. Alternative or in addition to, control signals in response to a change of one or more parameters of the firing pattern may be generated and transmitted to the emitting module. The firing pattern may define a plurality of parameters for controlling the emitter array. For example, the firing pattern may specify the address of an emitter to be activated and/or a temporal profile of light pulses emitted by a given emitter.

In some embodiments, the firing pattern may be generated based on one or more real-time conditions such as estimated/target measurement range (e.g., near-field obstacle detection or imaging, far-field obstacle detection or imaging), complexity of the environment (e.g., density of objects in an environment, distribution to potential objects, etc), eye-safety restriction and the like. For example, peak power or amplitude of light pulses may be increased for far-field measurement and reduced upon detection of an object in the near-field (e.g., eye-safety purpose or avoid near-field blind zone). In another example, the pattern of the emitters activated at the same time may be designed to reduce cross-talk effect (e.g., sparse firing pattern).

The pattern generator 1131 may generate a sensing pattern to be transmitted to the detecting module for controlling the detector array as described above. Alternative or in addition to, control signals in response to a change of one or more parameters of the sensing pattern may be generated and transmitted to the emitting module. The control signals may be transmitted to the detecting module in a synchronous manner such that the activation/deactivation of individual photosensors within the array is synchronized with the firing of corresponding light emitters.

The sensing pattern may define a plurality of parameters for controlling the detector array. For example, the sensing pattern may specify the address of a photosensor (i.e., one or more SPADs corresponding to a pixel) to be activated for simultaneous measurement, operational parameters for the detector array at pixel level, such as a subset of SPADs to be activated in a pixel or a selection of a subset of return signals for forming a sensor read-out, other operational parameters for the detector array (e.g., bias, sampling duration) and signal processing.

The pattern generator 1131 may generate a sensing pattern according to a pre-determined mapping relationship between the emitter array and the detector array and one or more real-time conditions. One or more parameters of the sensing pattern may be determined based on the mapping relationship. For example, address(s) of one or more SPADs may be selected for simultaneous measurement according to the emission pattern and the mapping relationship, and the selection can be altered flexibly during measurements. In another example, one or more operational parameters such as the selection of a subset of SPADs to be activated in a pixel or the selection of a subset of return signals for forming a sensor read-out may be determined based on the emission pattern (e.g., temporal profile of the multi-sequence), one or more detected real-time conditions, or a combination of both.

The emitting module, detecting module and the Lidar system may be configurable and dynamically adapted to various situations that may include, for example, spontaneous events (e.g., detection of an object) or slow-change events (e.g., performance drift of the system). One or more parameters of the emission pattern (e.g., the address of an emitter to be activated and/or a temporal profile of light pulses associated with a given emitter) and/or one or more parameters of the sensing pattern may be dynamically adjusted at a pixel level or sub-pixel level during measurement or during operation of the Lidar system. In some cases, the emission pattern and/or sensing pattern can be adjusted or generated per image frame, per distance measurement or periodically. Alternatively or in addition to, the emission pattern and/or sensing pattern can be adjusted or generated upon detection of a real-time condition.

In some cases, one or more parameters of the sensing pattern may be dynamically determined based on one or more detected real-time conditions and an emission pattern. For example, the location and/or address(es) of one or more SPADs selected for simultaneous measurement may be dynamically adjusted periodically or every pre-determined number of measurements to accommodate performance drift of the system. For instance, the group(s) of SPADs (e.g., address/location, shape of the active region) corresponding to a given emitter may be dynamically adjusted in response to the detection of a drift introduced by heat expansion. In some cases, one or more parameters of the sensing pattern may be dynamically determined based on detected real-time conditions only. For instance, the operational parameter for an individual photosensor such as the number of pulses or selection of pulses accumulated for forming a signal may be determined based on prior distance measurement generated by the signal analysis module. For example, based on the range of measurements and/or signal strength obtained from the prior readouts, a greater number of pulses may be accumulated for measurement in long distance and smaller number of pulses may be accumulated for measurement in short distance or higher reflection scenario. In another example, when the prior readout indicates an object is located in a near-filed, the emission pattern may be dynamically adjusted (e.g., lower peak power/optical energy of light pulses) and the corresponding sensing pattern may be adjusted such that fewer light pulses or light pulse(s) with lower peak power may be selected for outputting a sensor signal.

In some cases, the mapping relationship may be updated upon a change of one or more parameters of the sensing pattern. For instance, different SPADs may be associated with an emitter in response to the detection of a detection drift. Alternatively or in addition to, the mapping relationship may not be updated when one or more parameters of the sensing pattern are changed. For example, when one or more parameters of the sensing pattern are changed to accommodate a short-lived, ephemeral or spontaneous event such as variation of returned light flux, the mapping relationship may not be updated.

The signal analysis module 1133 may receive the sensor output signal from the detecting module and generate an image. In some cases, the signal analysis module 1133 may be configured to correlate the return signals to the sequence of measurement signals and calculate a distance based on the delay time between the correlated signals. In some embodiments, a distance may be calculated using the time of flight associated the multi-pulse sequence. In some cases, the time of flight associated with the multi-pulse sequence may be determined using the average of time of flight associated with each pulse within a sequence. The signal analysis module 1133 may calculate a distance based on a time of flight associated with the subset of the light pulses, and the time of flight may be determined by determining a match between the sequence of detected light pulses and the temporal profile. The measurements or results generated by the signal analysis module 1133 may also be used to determine one or more parameters of the sensing pattern or emission pattern as described above.

The provided adaptive control mechanism can be utilized in conjunction with various Lidar systems or can be used in various applications. A Lidar system equipped with the described adaptive control mechanism may be provided on a movable object to sense an environment surrounding the movable object. Alternatively, the Lidar system may be installed on a stationary object.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the Lidar systems may be integrated into a vehicle as part of an autonomous-vehicle driving system. For example, a Lidar system may provide information about the surrounding environment to a driving system of an autonomous vehicle. In an example, the Lidar system may provide a wide range of horizontal field of view and vertical field of view of the vehicle. An autonomous-vehicle driving system may include one or more computing systems that receive information from a Lidar system about the surrounding environment, analyze the received information, and provide control signals to the vehicle's driving systems (e.g., steering wheel, accelerator, brake, or turn signal).

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A light detection and ranging system comprising:
an array of emitters, wherein each of the emitters is individually addressable to emit a multi-pulse sequence into a three-dimensional environment, wherein at least a subset of the emitters are configured to emit multi-pulse sequences concurrently according to an emission pattern;

an array of photosensors, wherein each of the photosensors is individually addressable, wherein at least a subset of the photosensors are configured to receive light pulses according to a sensing pattern, wherein each photosensor of the subset of photosensors is configured to detect light pulses returned from the three-dimensional environment and generate an output signal for a pixel that is indicative of an amount of optical energy associated with at least a subset of the light pulses, wherein at least one photosensor comprises an active region within the photosensor that is dynamically adjustable at a sub-pixel level and wherein the at least one photosensor has an adjustable dynamic range by individually controlling an operation of a set of photodetectors of the at least one photosensor; and one or more processors electrically coupled to the array of emitters and the array of photosensors, wherein the one or more processors are configured to generate the emission pattern and the sensing pattern based on one or more real-time conditions.

2. The light detection and ranging system of claim 1, wherein each of the emitters comprises a set of laser diodes.

3. The light detection and ranging system of claim 2, wherein the set of laser diodes are electrically connected and are controlled by a driving circuit.

4. The light detection and ranging system of claim 1, wherein the emission pattern comprises an address of an emitter to be activated and a temporal profile of a multi-pulse sequence emitted by the emitter.

5. The light detection and ranging system of claim 4, wherein the temporal profile comprises one or more members selected from the group consisting of amplitude of each pulse from the multi-pulse sequence, duration of each pulse from the multi-pulse sequence, time intervals among the multiple pulses and number of the multiple pulses in the multi-pulse sequence.

6. The light detection and ranging system of claim 1, wherein each of the set of photodetectors is individually addressable and controllable.

7. The light detection and ranging system of claim 1, wherein a subset of photodetectors from the set of photodetectors are enabled to receive light pulses thereby forming the active region within the photosensor.

8. The light detection and ranging system of claim 1, wherein the sensing pattern comprises an address of a photosensor to be enabled, an address of a photodetector to be enabled, and one or more parameters for selecting the subset of the light pulses for accumulating the subset of the light pulses to generate the output signal for the pixel.

9. The light detection and ranging system of claim 8, wherein the one or more parameters comprise a number of light pulses in the subset of light pulses or a parameter indicating a combination of non-consecutive light pulses.

10. The light detection and ranging system of claim 1, wherein the one or more real-time conditions are obtained based on the detected light pulses.

11. The light detection and ranging system of claim 1, wherein the one or more real-time conditions comprise detection of an object located within a pre-determined distance threshold.

12. The light detection and ranging system of claim 1, wherein the one or more processors are further configured to calculate a distance based on a time of flight associated with the subset of the light pulses.

13. The light detection and ranging system of claim 12, wherein the time of flight is determined by determining a match between the light pulses returned from the three-dimensional environment and a temporal profile of the emission pattern.

14. A method for providing an adaptive control of a light detection and ranging system, the method comprising:

generating an emission pattern and a sensing pattern based on one or more real-time conditions;

activating, according to the emission pattern, at least a subset of emitters from an array of emitters to emit multi-pulse sequences concurrently, wherein each emitter of the array of emitters is individually addressable to emit a multi-pulse sequence into a three-dimensional environment; and enabling, according to the sensing pattern, at least a subset of photosensors from an array of individually addressable photosensors to receive light pulses, wherein each photosensor of the subset of photosensors is configured to detect light pulses returned from the three-dimensional environment and generate an output signal for a pixel that is indicative of an amount of optical energy associated with at least a subset of the light pulses, wherein at least one photosensor comprises an active region within the photosensor that is dynamically adjustable at a sub-pixel level and wherein the at least one photosensor has an adjustable dynamic range by individually controlling an operation of a set of photodetectors of the at least one photosensor.

15. The method of claim 14, wherein each emitter of the array of emitters comprises a set of laser diodes.

16. The method of claim 15, wherein the set of laser diodes are electrically connected and are controlled by a driving circuit.

17. The method of claim 14, wherein the emission pattern comprises an address of an emitter to be activated and a temporal profile of a multi-pulse sequence emitted by the emitter.

18. The method of claim 17, wherein the temporal profile comprises one or more members selected from the group consisting of amplitude of each pulse from the multi-pulse sequence, duration of each pulse from the multi-pulse sequence, time intervals among the multiple pulses and number of the multiple pulses in the multi-pulse sequence.

19. The method of claim 14, wherein each photodetector of the set of photodetectors is individually addressable and controllable.

20. The method of claim 14, wherein a subset of photodetectors from the set of photodetectors are enabled to receive light pulses thereby forming the active region within the photosensor.

21. The method of claim 14, wherein the sensing pattern comprises an address of a photosensor to be enabled, an address of a photodetector to be enabled, and one or more parameters for selecting the subset of the light pulses for accumulating the subset of the light pulses to generate the output signal for the pixel.

22. The method of claim 21, wherein the one or more parameters comprise a number of light pulses in the subset of the light pulses or a parameter indicating a combination of non-consecutive light pulses.

23. The method of claim 14, wherein the one or more real-time conditions are obtained based on the detected light pulses.

24. The method of claim 14, wherein the one or more real-time conditions comprise detection of an object located within a pre-determined distance threshold.

25. The method of claim 14, further comprising calculating a distance based on a time of flight associated with the subset of the light pulses.

26. The method of claim 25, wherein the time of flight is determined by determining a match between the light pulses returned from the three-dimensional environment and a temporal profile of the emission pattern.

27. The light detection and ranging system of claim 1, wherein the active region is dynamically adjusted by enabling a subset of photodetectors selected from the set of photodetectors.

28. The light detection and ranging system of claim 1, wherein at least a shape or size of the active region is dynamically adjusted to accommodate a detection drift.

29. The method of claim 14, wherein at least a shape or size of the active region is dynamically adjusted to accommodate a detection drift.

\* \* \* \* \*